US009824540B2

(12) United States Patent
Webb

(10) Patent No.: US 9,824,540 B2
(45) Date of Patent: *Nov. 21, 2017

(54) METHOD AND SYSTEM FOR GAMING REVENUE

(71) Applicant: JACKPOT RISING INC., Dallas, TX (US)

(72) Inventor: William Garrett Webb, Dallas, TX (US)

(73) Assignee: Jackpot Rising Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,276

(22) Filed: Apr. 24, 2017

(65) Prior Publication Data

US 2017/0228980 A1 Aug. 10, 2017

Related U.S. Application Data

(63) Continuation of application No. 15/220,079, filed on Jul. 26, 2016, now Pat. No. 9,633,513, which is a
(Continued)

(51) Int. Cl.
*G07F 17/00* (2006.01)
*G07F 19/00* (2006.01)
(Continued)

(52) U.S. Cl.
CPC ...... *G07F 17/3258* (2013.01); *G07F 17/3211* (2013.01); *G07F 17/3227* (2013.01); *G07F 17/3272* (2013.01)

(58) Field of Classification Search
CPC .. G07F 17/32; G07F 17/3225; G07F 17/3244; G07F 17/3258; G07F 17/323;
(Continued)

(56) References Cited

U.S. PATENT DOCUMENTS 7,600,251 B2 10/2009 Gatto et al.
8,414,387 B1 4/2013 Paradise
(Continued)

FOREIGN PATENT DOCUMENTS

WO 2016044051 A1 3/2016

OTHER PUBLICATIONS

International Search Report and Written Opinion issued in PCT Application No. PCT/US2015/027678 dated Aug. 14, 2015; 9 pages.

(Continued)

*Primary Examiner* — Milap Shah
(74) *Attorney, Agent, or Firm* — Fish & Richardson P.C.

(57) ABSTRACT

A method and system comprises integrating a contest framework into a game. The contest framework at least comprises means for communicating with a transactional server, a plurality of listeners being configured to monitor interactions during a play of the game for communication to the transactional server, and means for displaying notifications from the transactional server. The transactional server is at least configured for processing received interactions in conjunction with a progressive jackpot contest associated with the game and communicating notifications regarding the processing to the contest framework. A communicating with the transactional server at least comprises associating the game with a progressive jackpot contest and setting parameters for the progressive jackpot contest.

35 Claims, 26 Drawing Sheets

Related U.S. Application Data continuation of application No. 14/973,164, filed on Dec. 17, 2015, now Pat. No. 9,430,905, which is a continuation-in-part of application No. 14/573,593, filed on Dec. 17, 2014, now Pat. No. 9,373,223.

(51) Int. Cl.
*A63F 13/00* (2014.01)
*G07F 17/32* (2006.01)

(58) Field of Classification Search
CPC ............. G07F 17/3272; G07F 17/3274; G07F 17/3276; A63F 13/30–13/358
See application file for complete search history.

(56) References Cited

U.S. PATENT DOCUMENTS

| | | | | |
|---|---|---|---|---|
| 8,715,077 | B2 | 5/2014 | Paradise et al. | |
| 8,882,576 | B1 | 11/2014 | Paradise et al. | |
| 9,240,101 | B2 | 1/2016 | Paradise et al. | |
| 9,349,246 | B1 * | 5/2016 | Paradise | G07F 17/3225 |
| 9,479,602 | B1 * | 10/2016 | Paradise | H04L 67/18 |
| 2004/0259631 | A1 * | 12/2004 | Katz | A63F 3/00157 463/25 |
| 2005/0028166 | A1 * | 2/2005 | Chew | A63F 13/12 719/310 |
| 2005/0223219 | A1 | 10/2005 | Gatto | |
| 2005/0282637 | A1 | 12/2005 | Gatto et al. | |
| 2006/0142086 | A1 | 6/2006 | Blackburn | |
| 2007/0218979 | A1 * | 9/2007 | Momoda | A63F 13/12 463/25 |
| 2008/0090652 | A1 | 4/2008 | Kuehling | |
| 2008/0167117 | A1 | 7/2008 | Moshal et al. | |
| 2008/0191418 | A1 | 8/2008 | Lutnick et al. | |
| 2008/0214286 | A1 | 9/2008 | Lutnick et al. | |
| 2008/0234036 | A1 | 9/2008 | Reddicks | |
| 2008/0254883 | A1 | 10/2008 | Patel et al. | |
| 2008/0254893 | A1 | 10/2008 | Patel et al. | |
| 2009/0104987 | A1 | 4/2009 | Kelly et al. | |
| 2009/0318219 | A1 * | 12/2009 | Koustas | G07F 17/32 463/23 |
| 2009/0325715 | A1 | 12/2009 | Kelly | |
| 2010/0022307 | A1 * | 1/2010 | Steuer | A63F 13/12 463/42 |
| 2010/0105454 | A1 | 4/2010 | Weber | |
| 2011/0136577 | A1 * | 6/2011 | Dietz | A63F 13/77 463/43 |
| 2011/0225636 | A1 | 9/2011 | Keith et al. | |
| 2011/0294569 | A1 | 12/2011 | Tone et al. | |
| 2012/0004027 | A1 | 1/2012 | Larsen | |
| 2012/0108323 | A1 | 5/2012 | Kelly et al. | |
| 2012/0244948 | A1 | 9/2012 | Dhillon | |
| 2012/0270661 | A1 * | 10/2012 | Smith | A63F 13/12 463/42 |
| 2012/0302330 | A1 | 11/2012 | Kelly | |
| 2013/0029745 | A1 | 1/2013 | Kelly et al. | |
| 2013/0040729 | A1 | 2/2013 | Griffin | |
| 2013/0122999 | A1 | 5/2013 | Gagner et al. | |
| 2013/0150139 | A1 | 6/2013 | Oakes | |
| 2013/0184042 | A1 | 7/2013 | Lutnick | |
| 2013/0203497 | A1 | 8/2013 | Ogden | |
| 2013/0237314 | A1 | 9/2013 | Cannon | |
| 2013/0281206 | A1 | 10/2013 | Lyons et al. | |
| 2013/0281207 | A1 | 10/2013 | Lyons et al. | |
| 2013/0281208 | A1 | 10/2013 | Lyons et al. | |
| 2013/0281209 | A1 | 10/2013 | Lyons | |
| 2013/0331192 | A1 | 12/2013 | Betti | |
| 2014/0080590 | A1 | 3/2014 | Link et al. | |
| 2014/0094272 | A1 | 4/2014 | Kelly et al. | |
| 2014/0171189 | A1 | 6/2014 | Guan et al. | |
| 2014/0179390 | A1 | 6/2014 | Kelly et al. | |
| 2014/0194188 | A1 * | 7/2014 | Kosta | G07F 17/3279 463/25 |
| 2014/0330624 | A1 | 11/2014 | Mosites et al. | |
| 2014/0344061 | A1 * | 11/2014 | Choi | G06Q 30/0267 705/14.64 |
| 2015/0065226 | A1 | 3/2015 | Paradise et al. | |
| 2015/0202529 | A1 | 7/2015 | Paradise et al. | |
| 2015/0379811 | A1 | 12/2015 | Early | |
| 2016/0035190 | A1 | 2/2016 | Arnone | |
| 2016/0055710 | A1 | 2/2016 | Paradise et al. | |

OTHER PUBLICATIONS

International Search Report and Written Opinion issued in International Application No. PCT/US2016/067569 dated Feb. 24, 2017; 8 pages.
Written Opinion of the International Searching Authority issued in International Application No. PCT/US2016/62569, dated Feb. 24, 2017, 5 pages.
Office Action issued in Canadian Application No. 2,971,149, dated Aug. 10, 2017, 5 pages.

* cited by examiner

FIG. 7
700
415
705
710
410
515
720
650
Time Remaining
Game
Contest Type
Fee per Attempt
Current Jackpot
Current Leader
Your Current Score
14 : 02 : 37
Days : Hrs : Min
Angry Birds
Highest Score
$.25
$14,504.75
Birdman1
2,403
1,904
730
PLAY!
19 : 13 : 12
Days : Hrs : Min
Tank Battles
Most Kills
$.50
$6,132.50
Tanker22
41
730
PLAY!
20 : 17 : 02
Days : Hrs : Min
Words with Friends
Highest Score
$.25
$9,207
Wordsmith1
278
730
PLAY!
27 : 06 : 49
Days : Hrs : Min
X Racing
Fastest Time
$.75
$804
Racer12
1.31
2.11
730
PLAY!

FIG. 9
900
THE TANK BATTLES CONTEST HAS
EXPIRED AND A WINNER CROWNED!
A NEW CONTEST HAS STARTED!
905
Winner
910
Score
915
Your High
Tanker22
41
25
920
JACKPOT WON
$6,132.50
PLAY!
$.50
EXIT
925
730
DETAILS
805
VIEW OTHER CONTESTS
930
Account Balance: $35.50
940

Legend:

- 2200: System
- 2202, 2204: Network Region
- 2206: Global Network
- 2208, 2210: Server Device
- 2212, 2214, 2216, 2218, 2224, 2242, 2244, 2246, 2256, 2258, 2260 : Communication Channel
- 2220, 2234, 2248: Networking Device
- 2222: Server
- 2226, 2228, 2230, 2232: Client
- 2236, 2250: Processor
- 2238, 2252: GUI
- 2240, 2254: Interface device

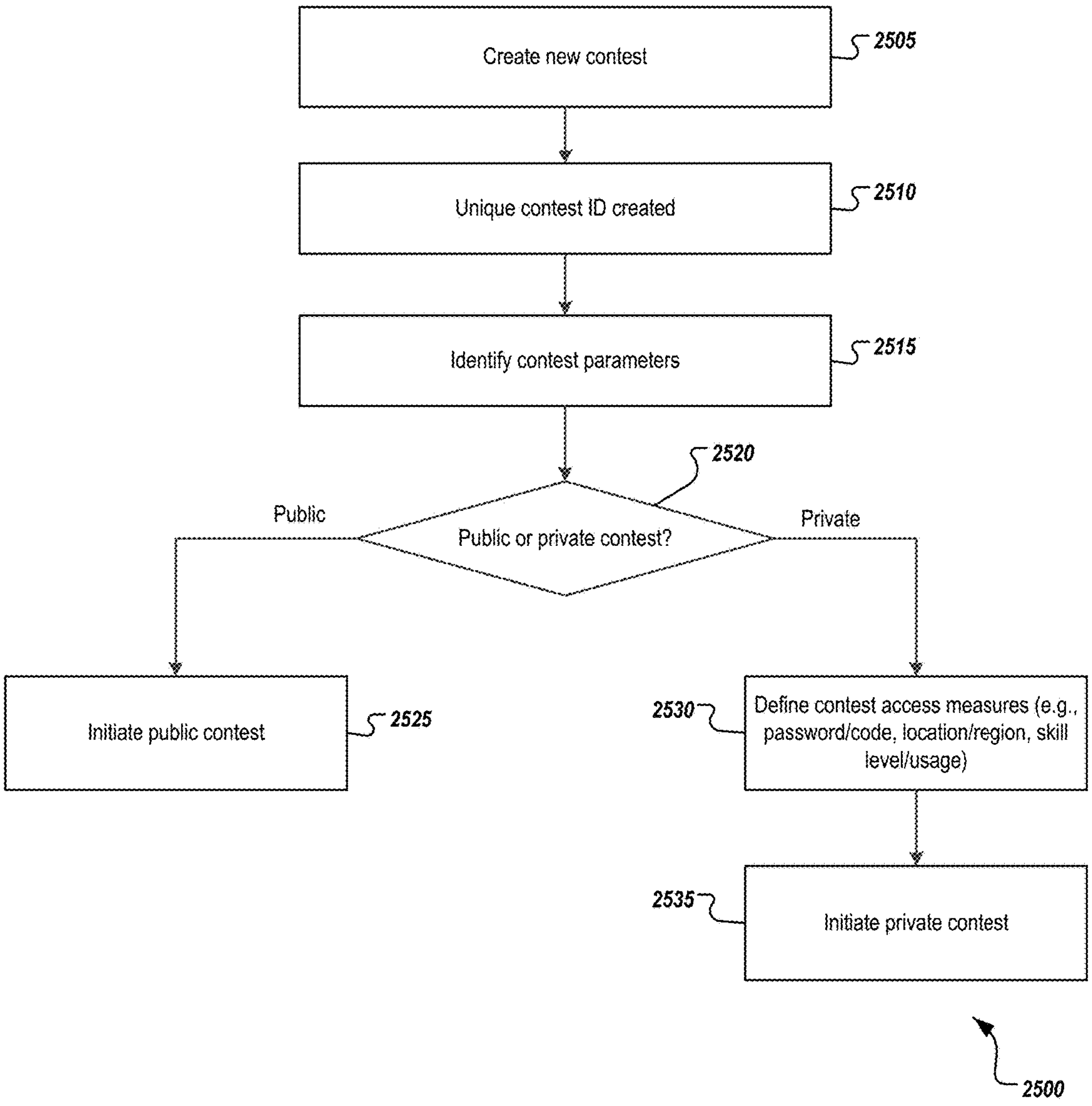
FIG. 25 – Developer Control: Private or Public Contest

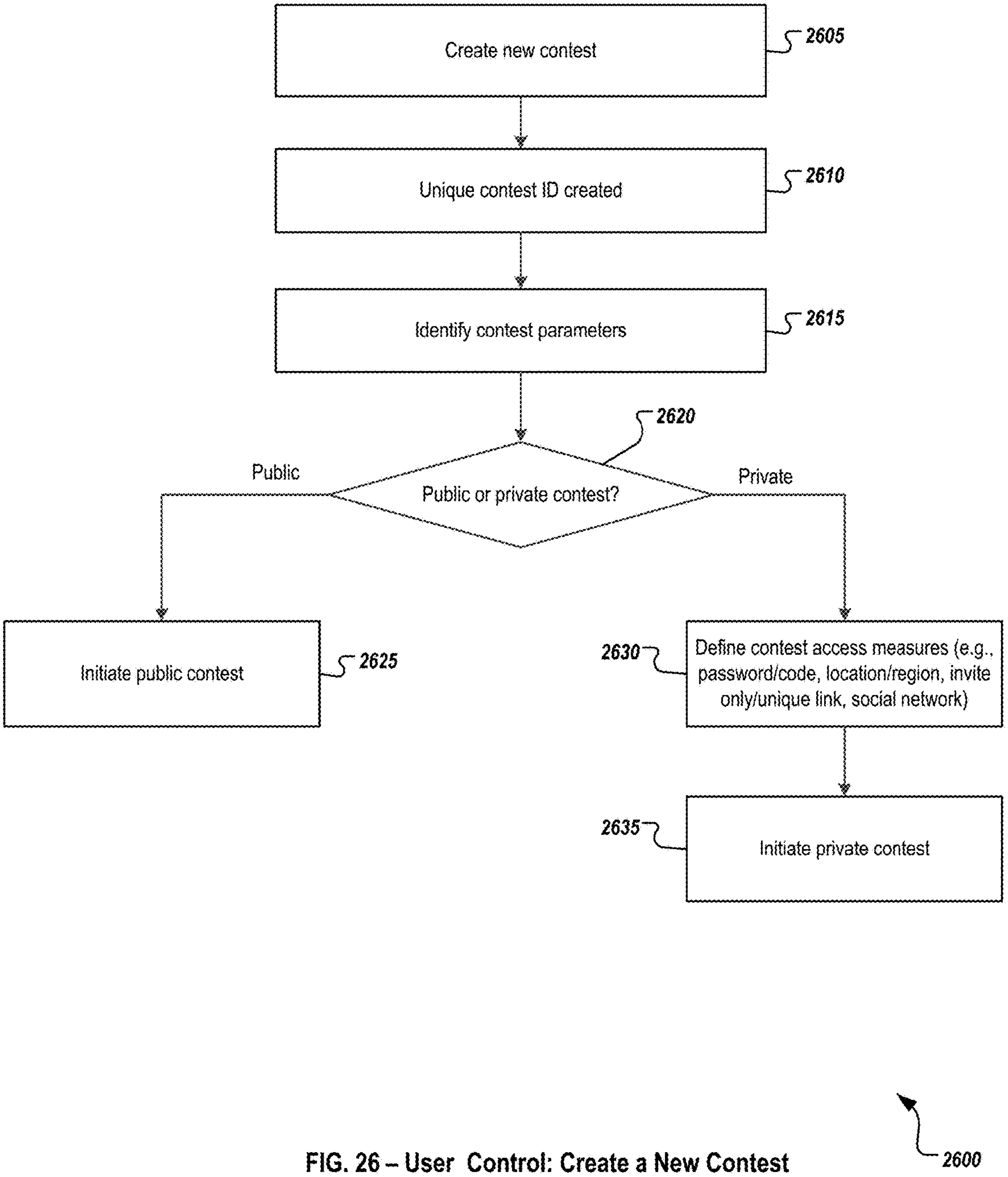
FIG. 26 – User Control: Create a New Contest

METHOD AND SYSTEM FOR GAMING REVENUE

CROSS-REFERENCE TO RELATED APPLICATIONS

This application is a continuation of and claims priority to U.S. patent application Ser. No. 15/220,079 filed on Jul. 26, 2016, which is a continuation of U.S. application Ser. No. 14,973,164 filed on Dec. 17, 2015, which is a continuation-in-part of and claims priority to U.S. patent application Ser. No. 14/573,593, entitled "A Method and System for Gaming Review", filed Dec. 17, 2014. The entire contents of which is incorporated by reference. Related PCT Application No. PCT/US2016/067569 filed Dec. 19, 2016 also claims the same priority.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to a mobile-gaming platform. More particularly, the invention relates to an application interface (API) and software-development kit (SDK) that allows third-party developers to generate gaming revenue for their online and mobile games.

BACKGROUND OF THE INVENTION

The following background information may present examples of specific aspects of the prior art (e.g., without limitation, approaches, facts, or common wisdom) that, while expected to be helpful to further educate the reader, are not to be construed as limiting the present invention, or any embodiments thereof, to anything stated or implied therein or inferred thereupon.

In the $24 billion mobile-gaming industry, a majority of in-application (in-app) revenue is generated from purchases of virtual currencies and goods; mobile players spend tens of billions of dollars each year for the challenge to accumulate the most virtual items, which hold zero value outside of the games that they play, and to add their names at the top of the leader boards. At best, this tendency is a testament to "game stickiness", which arises from any factor that encourages a player to stay longer and to return. However, to remain relevant in the gaming industry, third-party developers must not only promote the mirage of value associated with virtual incentives, they must also continuously update their games as well as try to retain users while monetizing their games at the same time. In view of the foregoing, it is clear that this approach is not perfect and leaves room for more optimal approaches.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. One such aspect of the prior art is believed to show a methods and systems for interfacing with a third-party application. Although it appears that the systems and methods disclosed are directed primarily to gaming machines and systems, some of the apparatuses, systems and methods disclosed might be adaptable for use in other types of devices, systems or environments, as applicable, such that their use is not restricted exclusively to gaming machines and contexts. At least one display device may be a mobile display device, such as a PDA or tablet PC that enables play of at least a portion of the primary or secondary game at a location remote from the gaming machine. For example, it is believed that the remote host or another host may provide a progressive game with a progressive jackpot to a group of gaming machines and that the gaming machine to which the remote host is sending content may be operable to play the progressive game but may not be currently participating in the progressive game at a particular time and thus not contributing to the jackpot, which in this example is one indicator of the group state of the gaming machine in the group. It is believed that when the progressive jackpot reaches a certain level or a game participant/player completes a certain task or a user creates qualifying notification settings, the remote host may send information to the gaming machine to indicate that the jackpot has reached a certain threshold to entice a player on the gaming machine to join the progressive game. Thus, it appears that the remote host may dynamically adjust content sent to the gaming machine based upon a group state for a group of gaming machines that the gaming machine is currently not affecting. Additionally, in other embodiments, it is believed that the request sent by third-party device may include a request to obtain a SDK from server-based system. It appears that in these embodiments, the SDK is used by third-party user to develop the content approval application or the graphical element creation application. Moreover, it is believed that in other embodiments, the SDK is used by third-party user to develop content that is displayed on gaming display device where the SDK includes the graphical element creation application.

By way of educational background, another aspect of the prior art generally useful to be aware of is that of what appears to be a gaming reality system and a mobile device that features the application of providing the player with many opportunities to win awards, such as cash or prizes to maintain a player's interest in a gaming machine. The application also appears to teach of using progressive jackpots for more experienced players, which may cause strategy to vary depending upon the current progressive amount. The application appears to make calls to the augmented reality technology SDK to determine if a tag is present in the current live camera image, and if so, the SDK returns the position of the tag relative to the user in 3D space. Additionally, the SDK appears compatible with Unity plugin, an Android or Apple smartphone/tablet with a rear-facing camera and ARM processor, and a video gaming machine with LCD or other flat screen displays.

As a point of educational reference, such approaches may not provide a progressive jackpot rewards system where gamers are allow to make as many attempts as they wish (no cap) at attaining the high score of a contest given that they have sufficient funds in their account and the contest time has not expired. Additionally, such approaches may not provide a dynamic rewards structure that may be manipulated by, for example, a web-based dashboard to perform varies functions such as create contests, implement different payout structures, adjust contest parameters, and send content, messages, and notifications to players. Furthermore, such approaches may not provide a social element that allows players to share contests and statuses, such as jackpot amounts, with others.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 25 is a flowchart of an exemplary method 2500 for developer creation of a new private or public contest, in accordance with an embodiment of the present invention;

FIG. 26 is a flowchart of an exemplary method 2600 for user creation of a new private or public contest, in accordance with an embodiment of the present invention.

Figure 1:
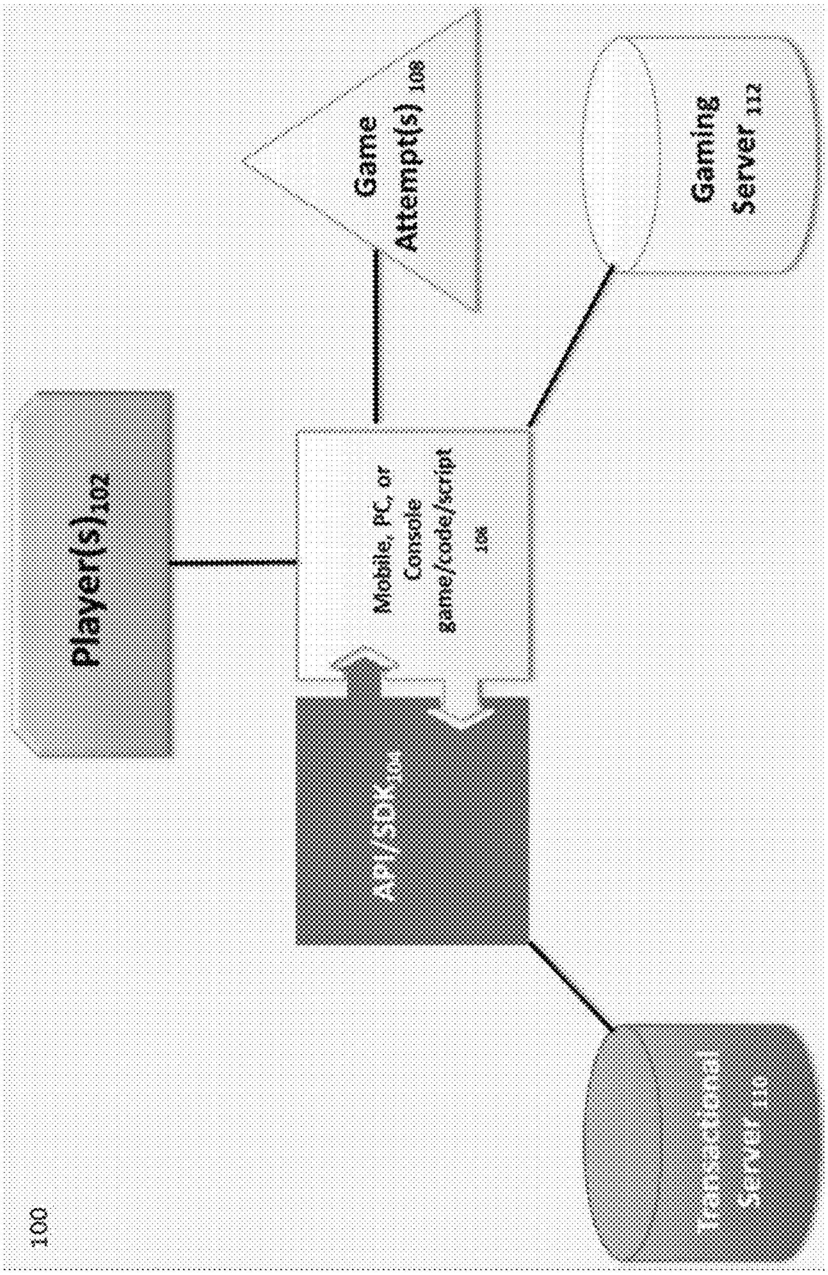
FIG. 1 illustrates a software-development kit (SDK) and application interface (API) that can be integrated into third-party games, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms “a,” “an,” and “the” include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java.™., Jini.™., C, C++, Smalltalk, Perl, UNIX Shell, Visual Basic or Visual Basic Script, Virtual Reality Markup Language (VRML), ColdFusion.™. or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., web site owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM.®. MQSeries.®. technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, aspects of the present invention may take the form of a computer program product embodied in one or more computer readable medium(s) having computer readable program code embodied thereon.

In the following description and claims, the terms “computer program medium” and “computer readable medium” may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as “processing,” “computing,” “calculating,” “determining,” or the like, refer to the action and/or processes of a computer or computing system, or similar electronic computing device, that manipulate and/or transform data represented as physical, such as electronic, quantities within the computing system’s registers and/or memories into other data similarly represented as physical quantities within the computing system’s memories, registers or other such information storage, transmission or display devices.

In a similar manner, the term “processor” may refer to any device or portion of a device that processes electronic data from registers and/or memory to transform that electronic data into other electronic data that may be stored in registers and/or memory. A “computing platform” may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments of the present invention may provide means and/or methods for storage, analysis, and/or management of data. In some of these embodiments, data may be provided by users and/or received from external software. Many embodiments, and variations thereof, may provide for a framework for contests.

FIG. 1 illustrates a software-development kit (SDK) and application interface (API) that can be integrated into third-party games, in accordance with an embodiment of the present invention. In the present embodiment, the SDK 104 is accessed through a transactional server 110. In some embodiments, the SDK 104 may also be accessed via a cloud network, a storage device, such as, but not limited to, a cd, disc or flash drive, or any kind of computer/CPU, processor or server that is capable of hosting the SDK 104. The SDK 104 may integrate with the third-party gaming platform with mobile, PC, or console programming, computer code, or script 106. In a non-limiting example, the integrated SDK 104 allows uninterrupted game play. In the present embodiment, the third-party programming, computer code, or script 106 may be accessed by player(s) 102, contest attempts 108, the SDK 104 and the gaming server 112. In an alternate embodiment, transactional server 110 may directly access or host the third-party programming 106 or connect with the gaming server 112 to retrieve needed data. In a non-limiting example, player(s) 102 interact through the third party gaming interface 106 but are connected to the SDK 104 behind the scenes. In the present embodiment, the SDK 104 may have a series of tools called listeners that may communicate with the third-party programming, computer code, or script 106 and report results and data involving any contest attempts 108 made by player(s) 102 to the transactional server 110. In another embodiment, the third-party gaming server 112 may report results to the SDK 104 or the transactional server 110 when a contest attempt 108 is made. In many embodiments, the transactional server 110 may take the results from any contest attempt 108 and use the data to perform functions such as, but not limited to, rank the contest attempt 108 results in relevant or associated contest(s) and apply the result to the player’s 102 profile and gaming history. In the present embodiment, the SDK 104 and the third-party gaming framework 106 communicate in the backend to ensure that gaming quality and user experience remains fluid. In the present embodiment, the SDK 104 may have ‘listeners’ embedded throughout the software to monitor and report user interaction data, metrics, and trip actions that notify the SDK 104/server 110 to perform a certain action. A listener may be generally known as a collection of nested interfaces with callbacks that captures the player(s) 102 interaction within the third-party gaming framework 106.

Figure 2:
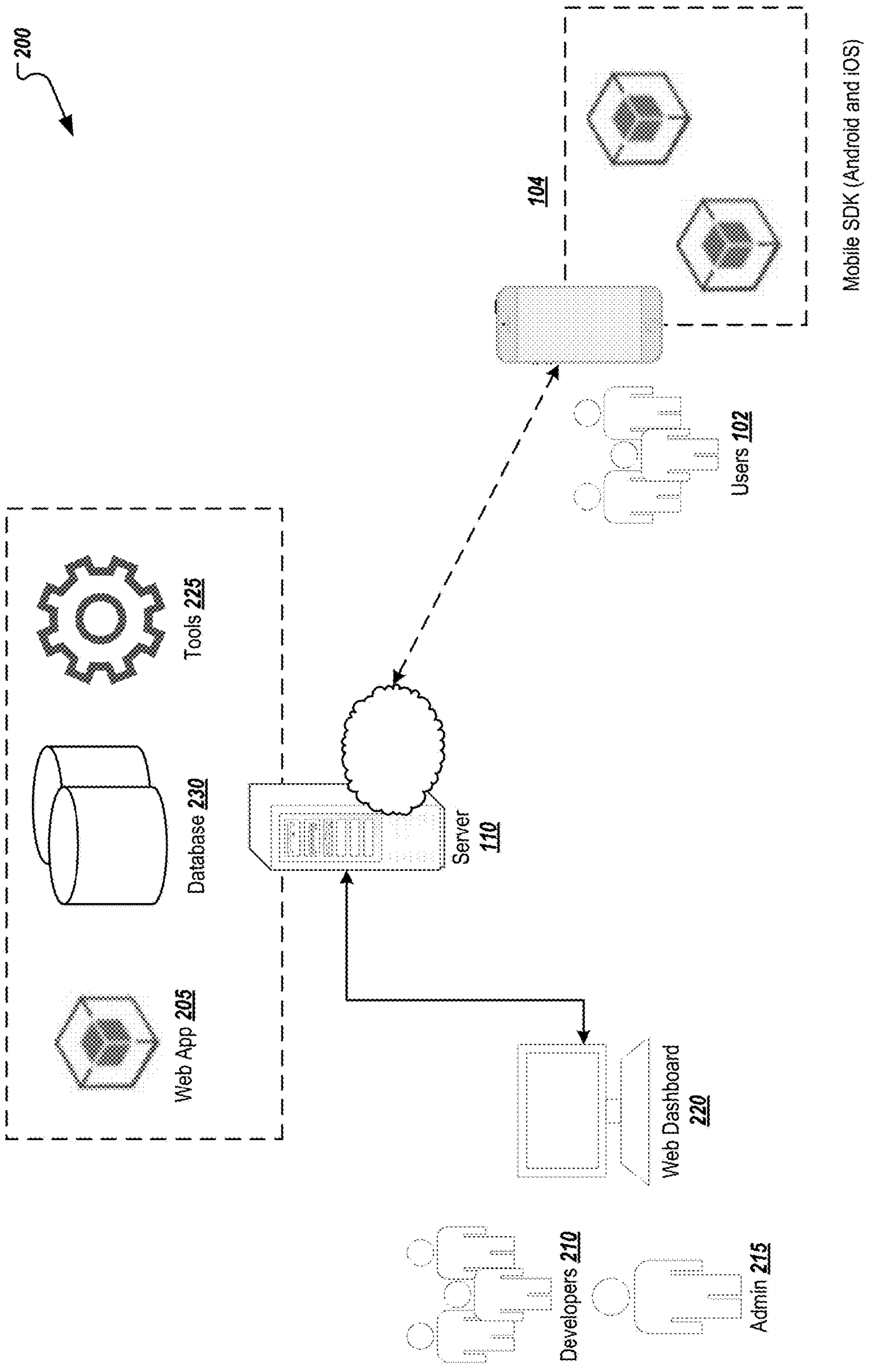
FIG. 2 illustrates a system architecture, in accordance with an embodiment of the present invention.

FIG. 2 illustrates a system architecture, in accordance with an embodiment of the present invention. In the present embodiment, server 110 provides the infrastructure upon which the software runs. In a non-limiting example, server 110 may be a dedicated infrastructure. In another non-limiting example, server 110 may be a cloud-based or shared infrastructure that is leased from a provider of cloud-based services. The web application 205 provides the software that runs on the server and contains the application and business logic of the innovation. The web application 205 may take data received from contest attempts 108 and may apply it to the correlating contest. The web application 205 is the engine that runs the platform, performing many different functions such as, but not limited to, holding, tracking and scoring contests, determining winner(s), and all other logic needed to operate such as, but not limited to, managing accounts of player(s) 102, deposits, contest attempt 108 histories, and more. The SDK 104 may be provided to a third-party developer 210 to be integrated into its apps, and once the SDK 104 is integrated, the administrator 215 may be given full control of the software via a web dashboard 220. The third-party developer 210 may have access to tools 225 that enhance the function of the software. Tools 225 may include, but are not limited to, integration instructions, debugging tools, plugins, sample integrations and other helpful resources that help simplify the integration process or supplement SDK 104 performance. In a non-limiting example, the third-party developer 210 may use an IP address to verify the location, primarily, without limitation, to ensure that the player(s) 102 are playing within a jurisdiction that allows the usage of this software. A database 230 provides storage for all persistent states of the software. Finally, the players 102 as "users" may be able to utilize the SDK 104 in the apps and games in which the third-party developer 210 has integrated the SDK 104. In a non-limiting example, players may still play the third-party game, even if the SDK is not integrated. In this example they may not be able to compete in progressive jackpot contests provided by the SDK. In another non-limiting example, if the SDK is integrated, players may still play the game without playing in a contest. In this example their game attempts and results simply are not reported or factored in to the contest(s) and only go towards that game's own internal leaderboard, if any. The platform described herein is intended to be used across a plurality of games, developers, and users. Because a plurality of games, users, and developers may be managed by the platform, the unique API keys associated with particular games, along with the specific API calls (including user identification information and a particular event associated with a contest), can be used to associate particular contest entries and interactions with particular users, games, developers, and contests. Further description of the multi-gaming and developer system is described in regard to FIG. 23 below.

Figure 3:
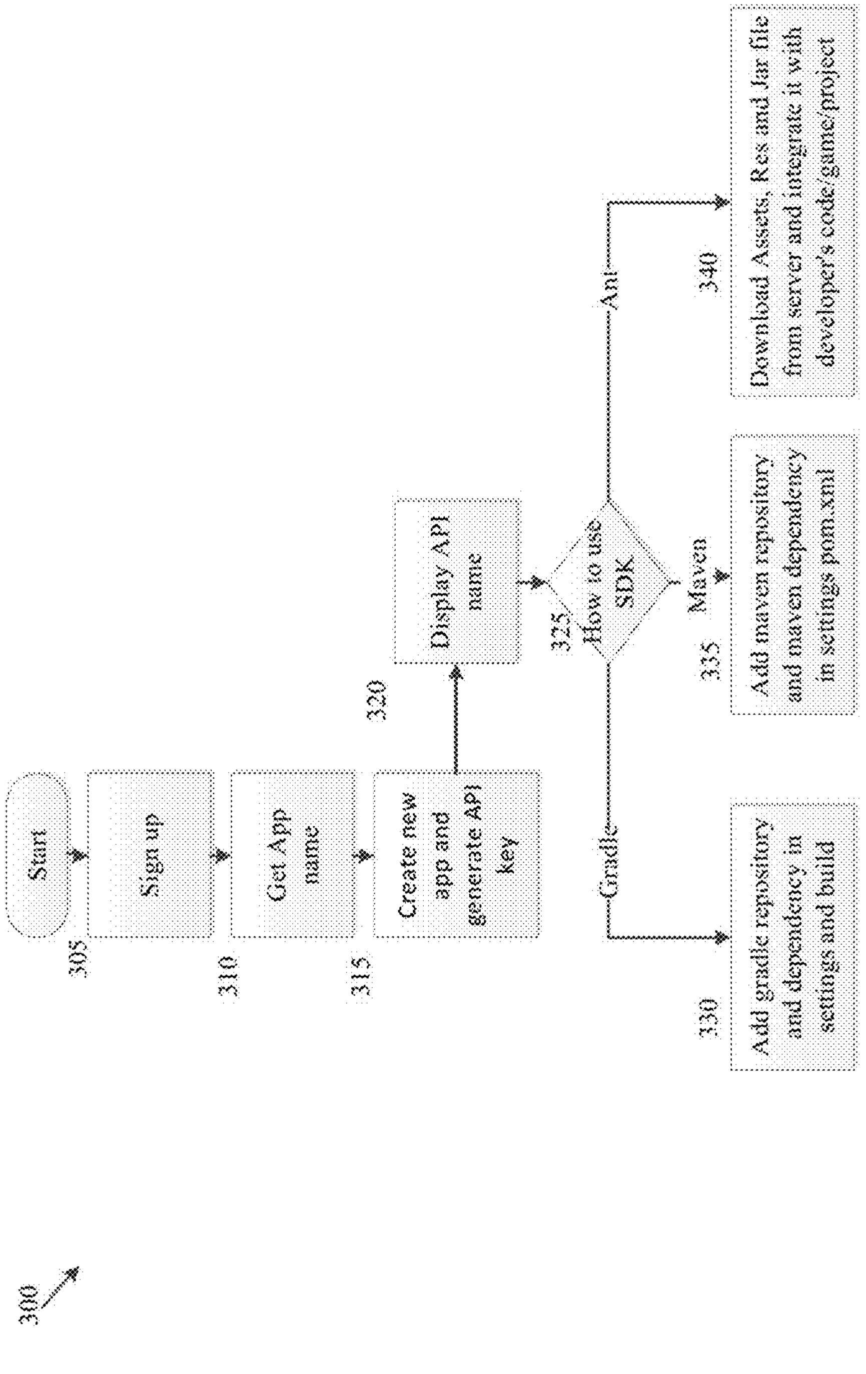
FIG. 3 is a flowchart of an exemplary method 300 for integrating the SDK, in accordance with an embodiment of the present invention.

FIG. 3 is a flowchart of an exemplary method 300 for integrating the SDK, in accordance with an embodiment of the present invention. In the present embodiment, the third-party developer 210 signs up by creating a profile in a step 305, and, using the web dashboard, generates an app name in a step 310, and creates a new app and receives a unique API key for and specific to the game/app 106 in a step 315. In an alternate embodiment, third-party developer 210 may be assigned a unique API key for each particular app or game being created, where the unique API key can then be embedded in the corresponding games along with the SDK and use for authentication while talking with the SDK within the game. After the API key is displayed in a step 320, the third-party developer 210 may elect, in a step 325 to integrate the API key with the SDK 104 into the corresponding app via, without limitation, a Gradle, an Ant, or a Maven build system. For a Gradle build system, the third-party 210 may use the Gradle repository link (build.gradle) to add dependency in the settings and build, in a step 330; for a Maven build system, the third-party developer 210 may add the Maven repository and dependency in the pom.xml settings, in a step 335; and, for an Ant build system, the third-party developer 210 may download Assets, Res, and Jar files from the web dashboard 220 server 110 and integrate the files into the code or game 106, in a step 440. In other embodiments, the API key may be integrated with the SDK 104 by other means such as, but not limited to, other alternate programming languages.

Figure 4:
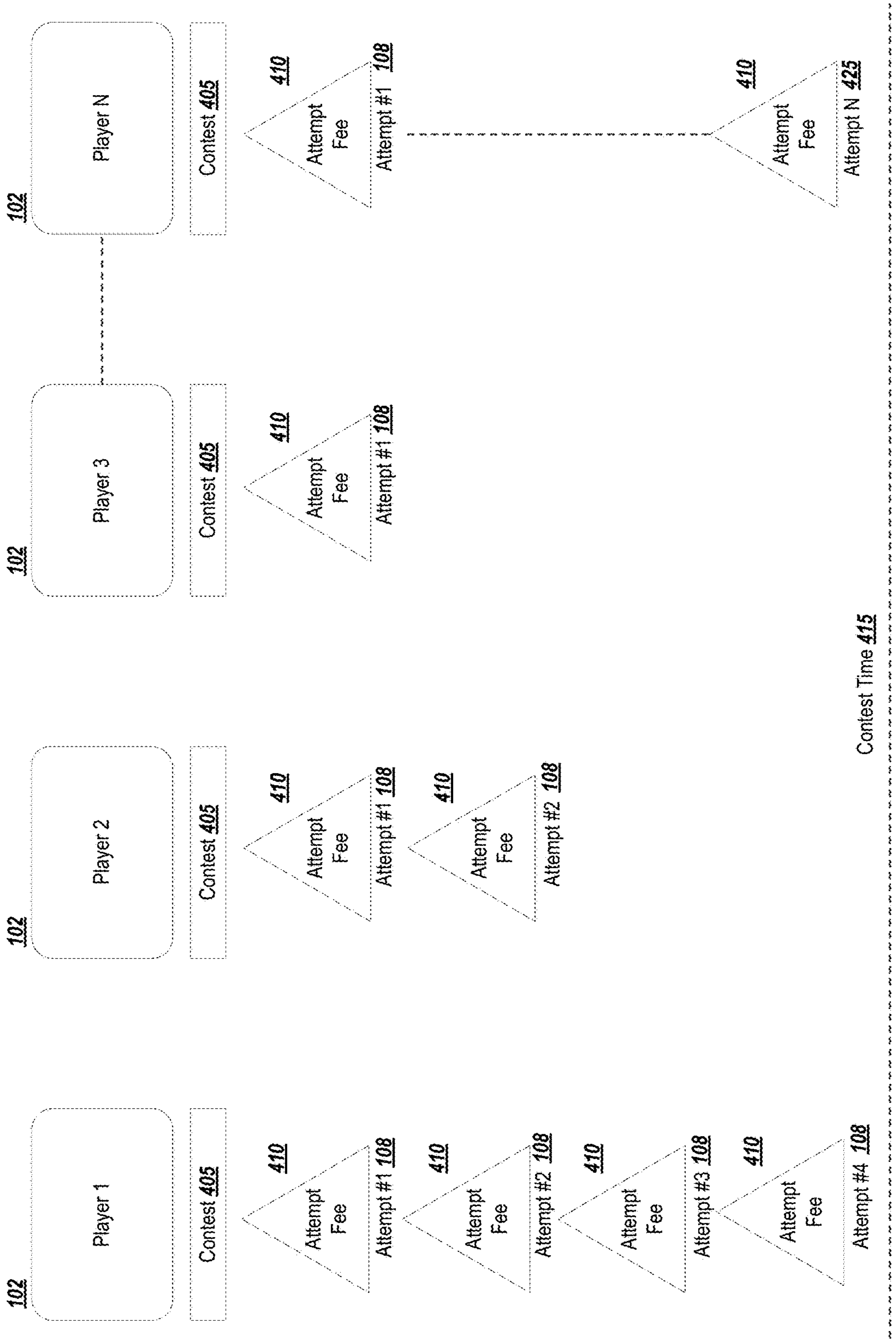
FIG. 4 illustrates a player using deposited funds to pay an attempt fee architecture, in accordance with an embodiment of the present invention.

FIG. 4 illustrates a player using deposited funds to pay an attempt fee architecture, in accordance with an embodiment of the present invention. In the present embodiment, a player 102 may make a contest attempt 108 at any time during a contest 405 as long as he has sufficient funds to pay the attempt fee 410 and the contest time 415 has not expired. An unlimited number of players 420 may make unlimited contest attempts 425 during unexpired contest time 415.

Figure 5:
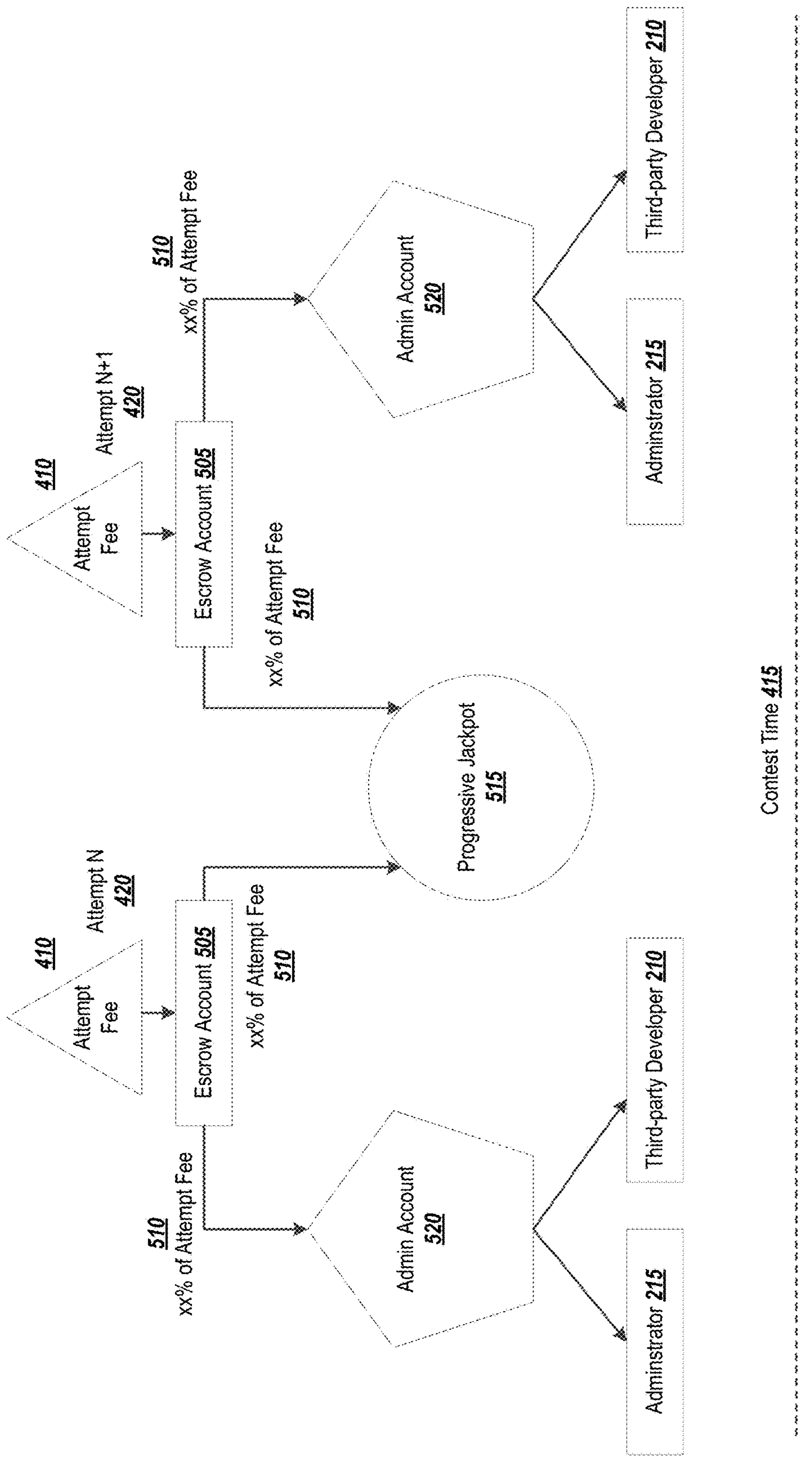
FIG. 5 illustrates the fee-splitting architecture, in accordance with an embodiment of the present invention.

FIG. 5 illustrates the fee-splitting architecture, in accordance with an embodiment of the present invention. In the present embodiment, for each contest attempt 108 by a player 102, the attempt fee 410 may be held in escrow 505 until the result of the attempt 108 has been reported to the server 110. When the result of the attempt 108 is reported to the server 110, the funds may be released from escrow into the appropriate accounts, according to the parameters set in the web dashboard 220. The attempt fee 410 is split between a fixed percentage 510 going toward the progressive jackpot 515 and a fixed percentage 510 going toward the administrator account 520 to be split between the administrator 215 and the third-party developer 210 of the game 405. In a non-limiting example, the fee-splitting percentages are, in the web dashboard 220, defined by either the administrator 215 or the third-party developer 210. In the present embodiment, the administrator 215, without limitation, may implement a minimum and a maximum percentage of each attempt fee 410 that either the administrator 215 or the third-party developer 210 may receive or a minimum and a maximum percentage of each attempt fee 410 that goes to the progressive jackpot 515 of the contest 405. The administrator 215 may have access and overriding control over aspects in the web dashboard 220, including, but not limited to, contests 405, parameters of contests 405, and level of access granted to the third-party developer 210. The attempt fee 410 may be refunded if a contest 405 is not available when the results of a contest attempt 108 are reported. The administrator 215 may also manually administer a refund if the administrator 215 deems it appropriate.

Figure 6:
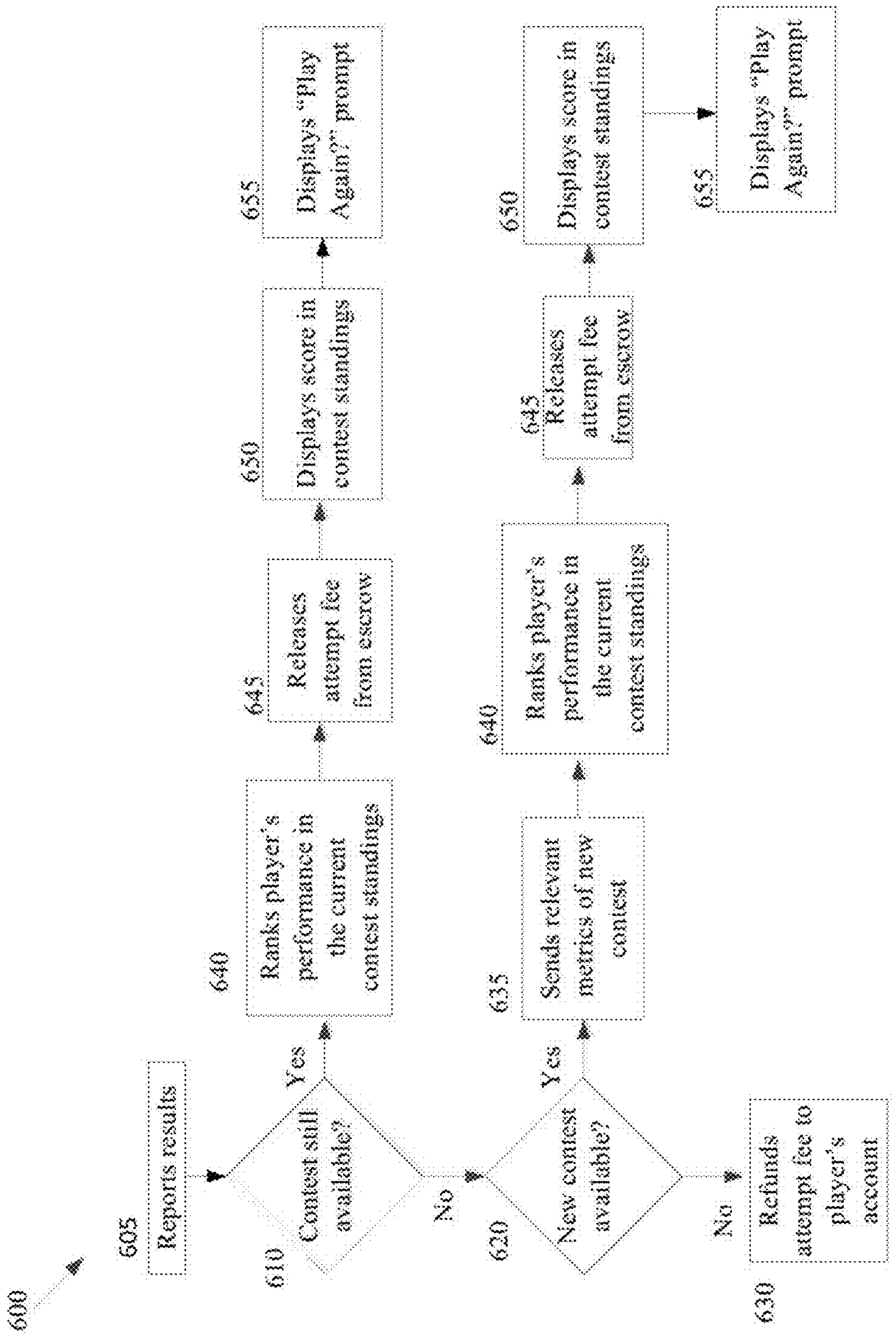
FIG. 6 is a flowchart of an exemplary method 600 for reporting scores, in accordance with an embodiment of the present invention.

FIG. 6 is a flowchart of an exemplary method 600 for reporting scores, in accordance with an embodiment of the present invention. In the present embodiment, when a contest attempt 108 is completed, the SDK 104 reports results in a step 605. The SDK then determines whether the contest 405 is still available in a step 610. If the SDK 104 determines that the contest 405 is not available, then the SDK 104 determines whether a new contest 108 is available in a step 620. If the SDK 104 determines that a new contest 108 is not available, then the SDK 104 refunds the attempt fee to the account of player 102 in a step 630. If the SDK 104 determines that the contest 405 is still available in a step 610, then the SDK 104 ranks the performance of player 102 in a step 640, releases the attempt fee 410 in a step 645, displays the score of player 102 in a step 650, and displays the "Play again?" prompt in a step 655. If, however, the SDK 104 determines that the contest 405 is not available and that a new contest is available in a step 620, the SDK reports and applies relevant metrics from the attempt 108 made to the new contest in a step 635, ranks the performance of the player 102 in a step 640, releases the attempt fee 410 in a step 645, displays the score of player 102 in a step 650, and displays the "Play again?" prompt in a step 655.

Figure 7:
FIG. 7 illustrates a contest lobby, in accordance with an embodiment of the present invention.

FIG. 7 illustrates a contest lobby, in accordance with an embodiment of the present invention. In the present embodiment, a player 102 may access the contest lobby 700 through a web dashboard 220 or app/website. In some embodiments, the app/website may provide the user with a list of apps/games that have integrated the SDK 104 along with a list of current contests. The contest lobby 700 displays a list of current games 705 that have integrated with the SDK 104. In a non-limiting example, the game 705 may include Angry Birds, Tank Battles, Words with Friends, and X racing. In the present embodiment, the lobby 700 also displays, without limitation, for each game 705, the contest time 415 as "time remaining", the contest type 710, the attempt fee 410, the progressive jackpot 515 as "current jackpot", the current leader and score 720, and the current score 640 of player 102. In a non-limiting example, the remaining contest time 415 may be displayed in days, hours, and/or minutes. In another non-limiting example, the contest type 710 may include, without limitation, highest score, most kills, fastest time, longest time duration, hightest level, ect. In another non-limiting example, the jackpot 515 is displayed in american currency. In other embodiments, the jackpot may be displayed in another currency or virtual currency. In the present embodiment, a player 102 may join any contest 405 via the "play" button 730. In other embodiments, player 102 player may also join, without limitation, via a link shared on social media, an in-app notification prompt (link provided), a push notification (link provided), an email (link provided), text message (link provided), QR code (link provided), or other electronic methods that provides a link to join a contest.

Figure 8:
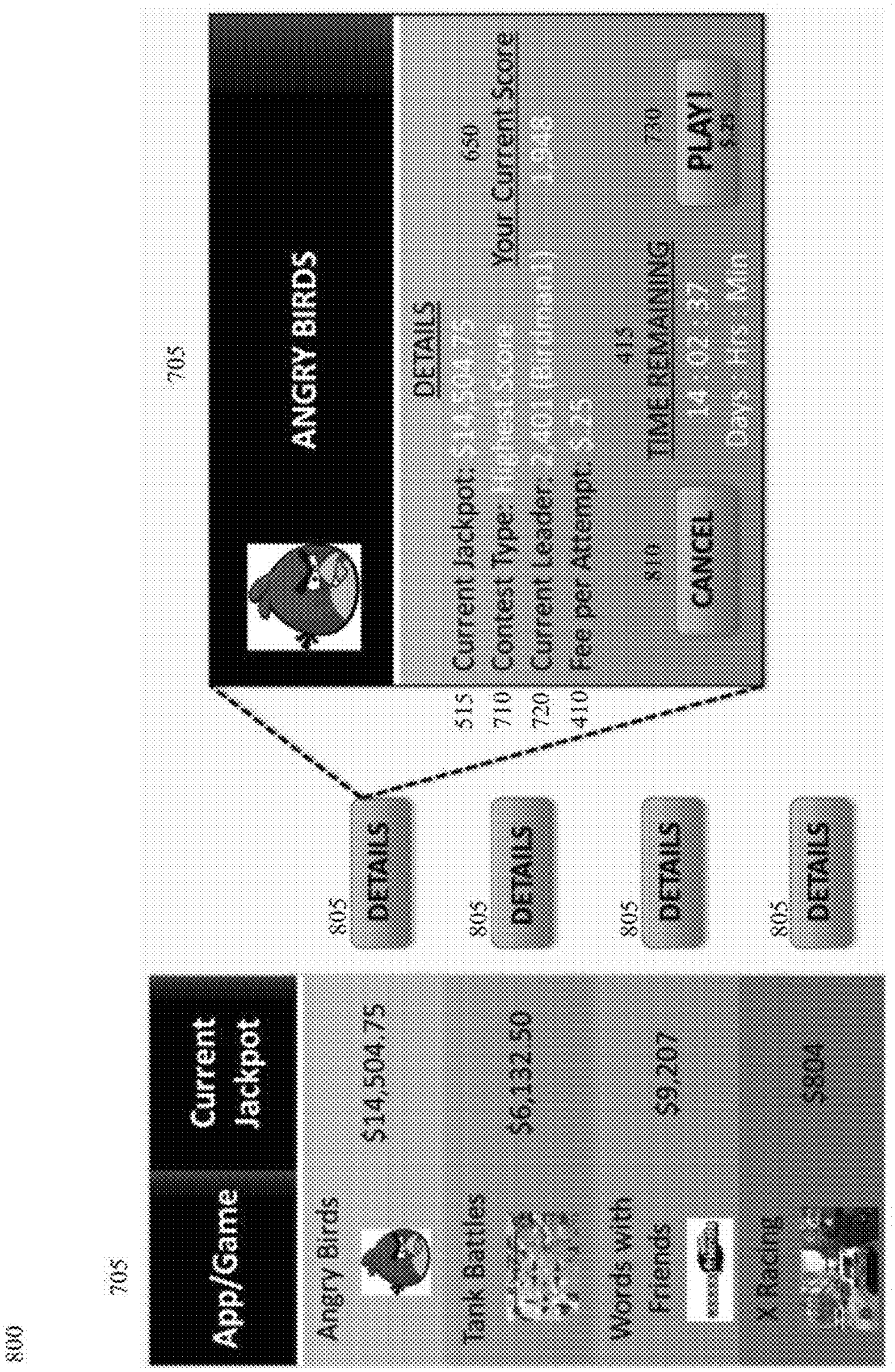
FIG. 8 illustrates the details screen of a contest lobby, in accordance with an embodiment of the present invention.

FIG. 8 illustrates the details screen of a contest lobby, in accordance with an embodiment of the present invention. In the present embodiment, a player 102 may access the details screen 800 of a contest lobby 700, via a web dashboard 220 or app/website, by selecting the detail button 805 that corresponds to the current game 705. In some embodiments, details may be provided after an attempt is made to show a player how he/she measures up to current status of the contest. In some embodiments, details may be provided in an in-app notification prompt, a push notification, an email, text message, QR code, or other electronic methods that provides a link to join a contest. The details screen 800 may display, without limitation, the progressive jackpot 515 as "current jackpot", contest type 710, the current leader and score 720, the current score 650 of player 102, the fee per attempt 410, and contest time 415 as "time remaining". In some embodiments the administrator 215 may control and edit what is displayed on screens, including, but not limited to, the details screen 800 via the web dashboard 220. In a non-limiting example, the game 705 may include Angry Birds, Tank Battles, Words with Friends, and X racing. In a non-limiting example, the remaining contest time 415 may be displayed in days, hours, and/or minutes. In another non-limiting example, the contest type 710 may include highest score, most kills, or fastest time. In another non-limiting example, the current jackpot 515 is displayed in American currency but may be displayed in other currencies should the administrator 215 choose. In the present embodiment, a player 102 may join any contest 405 via the "play" button 730. In other embodiments, player 102 may join via a "play" button on other screens and in other electronic messages. In the present embodiment, the player 102 may choose to cancel the detail lobby 800 via the "cancel" button 810, to return to contest lobby 700, or to join a game 705 via the "play" button 730.

Figure 9:
FIG. 9 illustrates a general notification, in accordance with an embodiment of the present invention.

FIG. 9 illustrates a general notification 900, in accordance with an embodiment of the present invention. In the present embodiment, the displayed information, without limitation, may include the winner 905 of game 705, the winner's score 910, the high score 915 of player 102, the jackpot 920 won by winner 905, a "play" button 730 for a new game 705, and an exit button 925 to exit the gaming server 112. In other embodiments, for ongoing contests, notification 900 may include, without limitation, time remaining, current leader +score, and player's current score (if any). From the notification screen, the player 102 may, without limitation, be directed to the detail lobby screen 800 of the current contest 705 via the details link 805, the contest lobby 700 via the view other contests link 930, the player's 102 account balance 940, the player's profile/account, and help.

Figure 10:
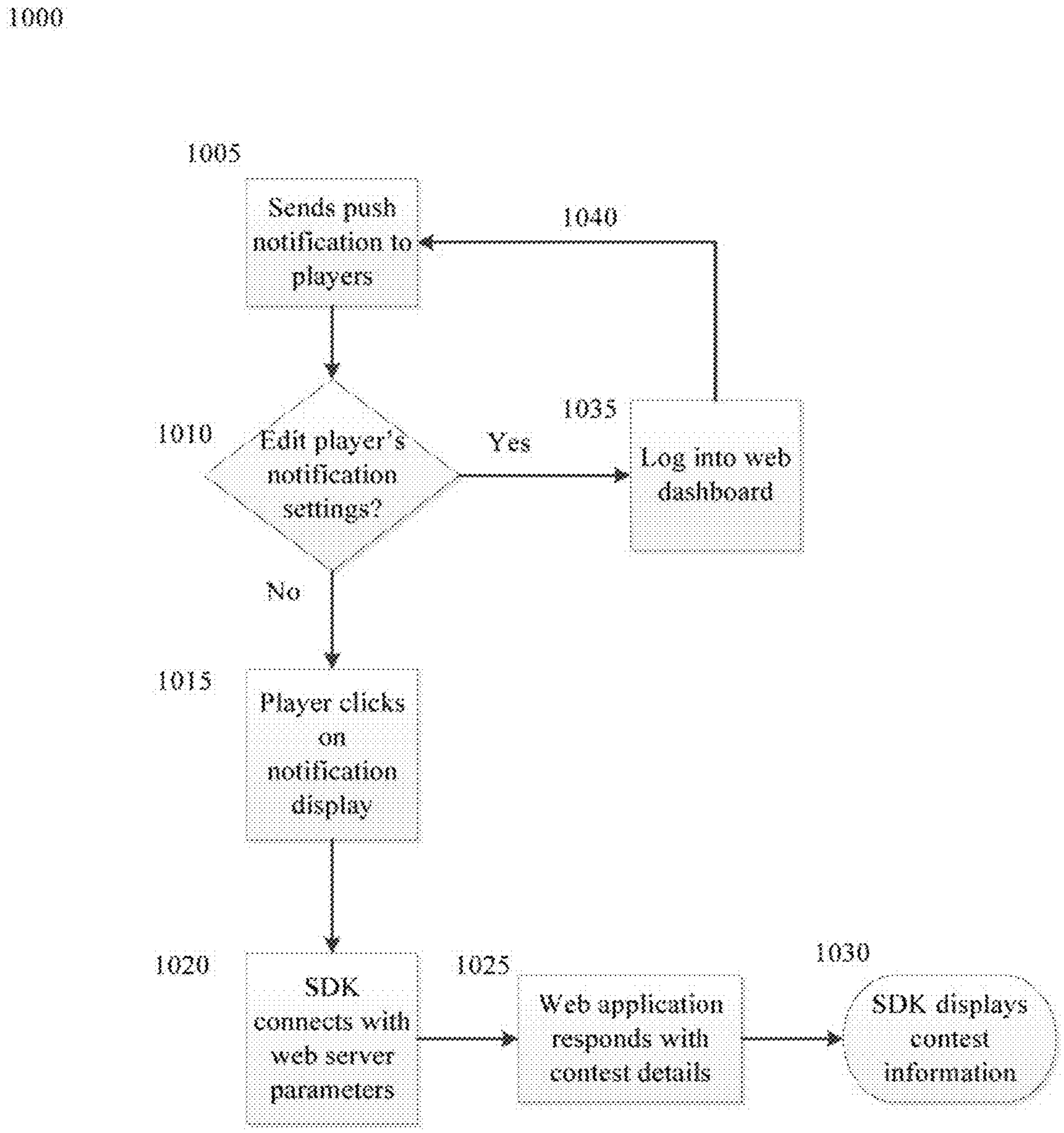
FIG. 10 illustrates an exemplary method 1000 for sending notifications to players, in accordance with an embodiment of the present invention.

FIG. 10 illustrates an exemplary method 1000 for sending notifications to players, in accordance with an embodiment of the present invention. In the present embodiment, either an administrator 215 or a third-party developer 210 may send to players 102 a push notification about, without limitation, an update, a growing jackpot, or a new contest in a step 1005. In other embodiments, additionally, a player/user may share a contest or attempt result with another user to inform them of an interesting contest/jackpot/game/etc. or let them know of a great score. In a non-limiting example, the auto-display feature may be conditionally activated when a player 102 finishes an attempt 108. In a non-limiting example, notifications may be a push or an in-game notification. In another non-limiting example, the in-game notifications may be a general prompt 900, a register prompt 1100, a deposit prompt 1300, or a post attempt prompt 1500. In the present embodiment, players 102 may elect to edit their push notification settings, in a step 1010 by logging into their account via the web dashboard 120, app/website, or through the account settings link, either hyperlinked via the account balance 940 as pictured or via its own icon in game notification 900 in a step 1035, in which the system may respond to the player setting in a step 1040. After an attempt 108, a notification display 900 may appear that displays the player's results and how that player ranked in the contest along with contest standings and jackpot information. The player 102, at a step 1015, selects the notification display 900. When the player 102 selects the notification display 900, the SDK 104 connects with the web server 110 parameters, in a step 1020. In a non-limiting example, the web server 110 parameters may be the current user level, age, location, account authentication, account status and whether the player 102 is eligible for that particular contest. The web application 220 responds with the current ongoing contest, in a step 1025 and accordingly, the SDK 104 displays to the player 102 contest details 1030. In some embodiments, if the player does not have sufficient funds to participate, a deposit prompt may appear.

Figure 11:
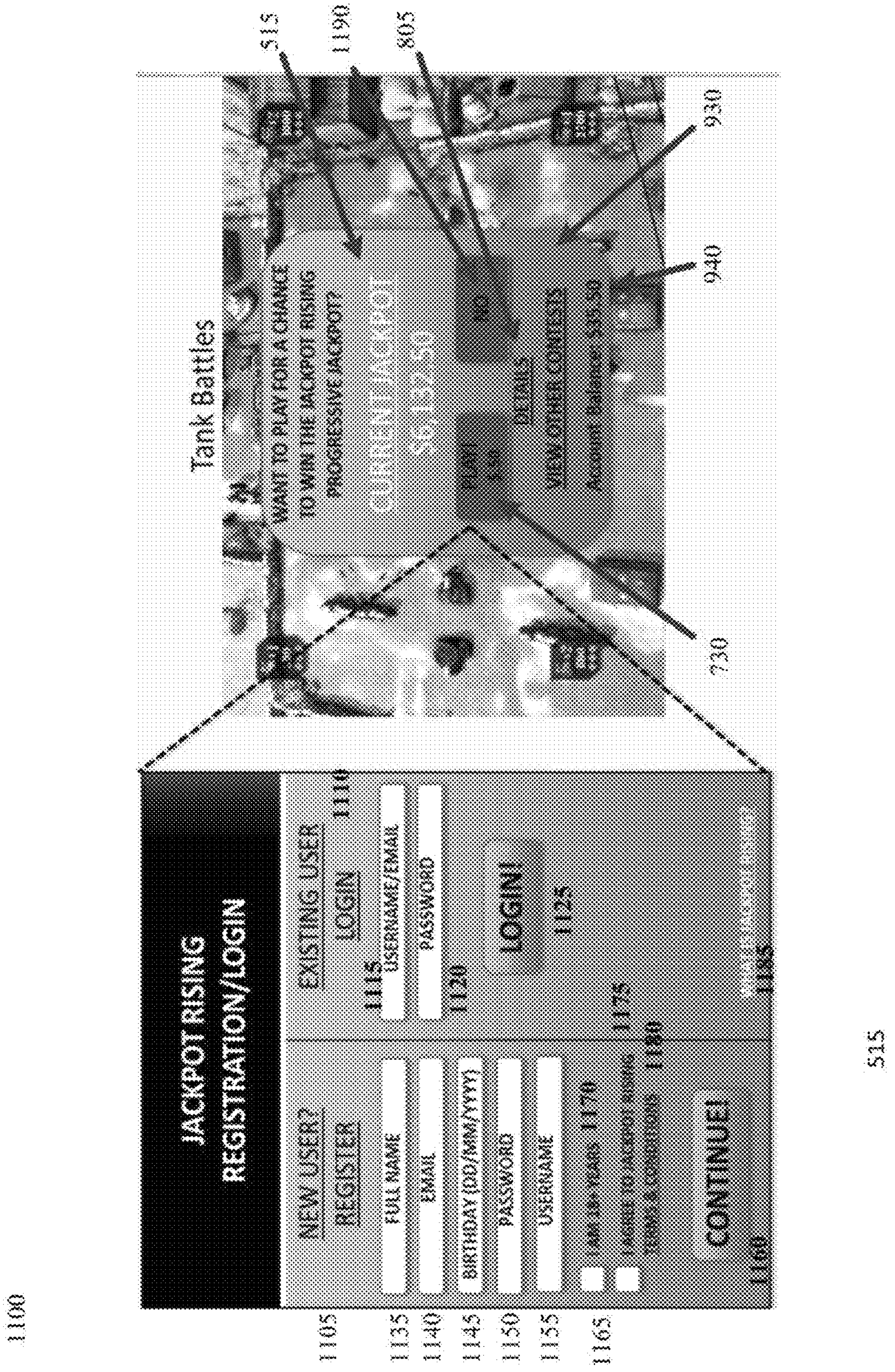
FIG. 11 illustrates an in-game notification registration prompt, in accordance with an embodiment of the present invention.

FIG. 11 illustrates an in-game notification registration prompt, in accordance with an embodiment of the present invention. In the present embodiment, a general notification display 900 may prompt the player 102 of a new contest. In some embodiments, other means of electronic communications including, but not limited to, email (link provided), text (link provided), social media (link provided), QR code (link provided), etc. may notify the player. The player 102, through the "play" button 730 must register or login via the in-game notification registration prompt 1100 if they chose to play or click on the "no" button 1190 to exit. In some embodiments, the player may exit to normal game third-party gameplay as if they simply continued with the game as if the prompt never appeared. In some embodiments, notification may pop up again in the future should they keep playing the third-party game. The registration prompt 1100 accommodates both new user registration 1105 and existing registered users 1110. The prompt 1100 has, without limitation, fields for existing players 102 to type their username 1115 and password 1120, and a "login" button 1125 to enter the game lobby 700. The prompt 1100 for a new player has, without limitation, fields for new player to type full name 1135, email 1140, birthdate 1145, password 1150, username 1155 and a continue button 1160. The registration prompt 1100 may also contain legal terms of use 1165. In a non-limiting example, the legal terms may be consenting that player 102 over age of 18 1170, agreeing to the terms and conditions 1175, a link embedded to the terms and conditions 1180, and an embedded help link 1185. In some embodiments, user registration 1105 may include, without limitation, the player's phone number and address.

Figure 12:
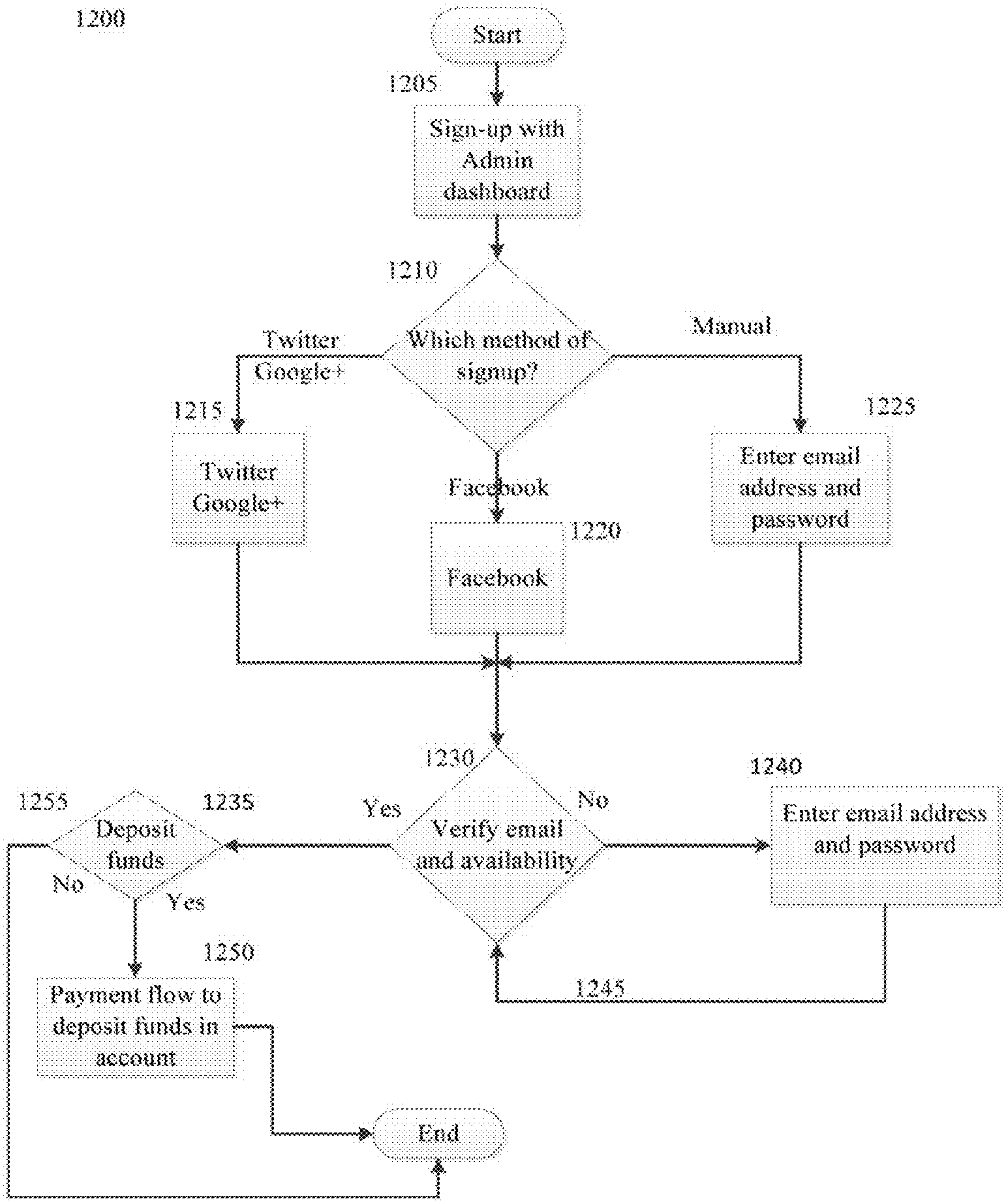
FIG. 12 is a flowchart of an exemplary method 1200 for player registration, in accordance with an embodiment of the present invention.

FIG. 12 is a flowchart of an exemplary method 1200 for player registration, in accordance with an embodiment of the present invention. In the present embodiment, a player 102 may sign up through the administration dashboard 120, in a step 1205 by electing to use in a step 1210 a Twitter/Google Plus account in a step 1215, or, a Facebook account in a step 1220 or, by manually entering an email and password in a step 1225. In other embodiments, other social media accounts may be linked. The registration system, in a step 1230, may verify if that email is available and, if yes, in a step 1235, continue to prompt player 102 to deposit funds. If the email is not available, the player 102 may be prompted for email again in a step 1240 and the system may again verify the email availability in a step 1230. In a non-limiting example, the system may automatically ping the given email address to ensure it exist or email availability may be checked through database 230 on transactional server 110. If the player 102 elects to deposit funds, in a step 1235, the deposit prompt notification 1300 may assist the player 102 in making deposit, in a step 1250. Once the deposit is successful, or if the player 102 elects not to deposit funds, at a step 1255, the registration process concludes. In some embodiments, the player may be prompted to deposit when he/she tries to enter a contest or make an attempt but doesn't have sufficient funds. The user may also go into his/her account details via web dashboard and/or app/website and deposit.

Figure 13:
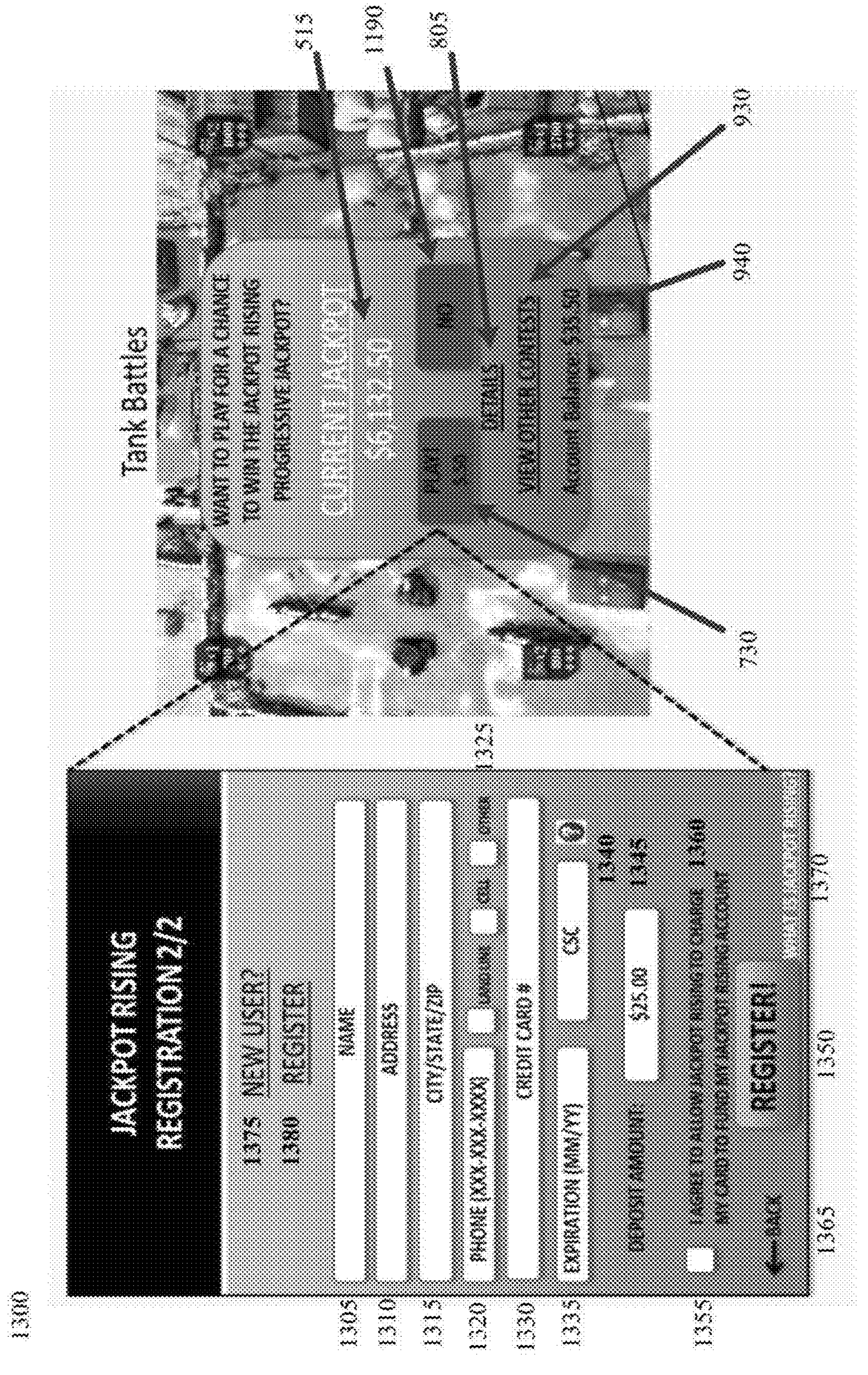
FIG. 13 illustrates an in-game notification deposit prompt, in accordance with an embodiment of the present invention.

FIG. 13 illustrates an in-game notification deposit prompt, in accordance with an embodiment of the present invention. In the present embodiment, following the registration prompt 1100 continue button 1160, the player 102 is taken to the deposit prompt 1300. The deposit prompt 1300 has, without limitation, fields for players to type their name 1305, address 1310, city/state/zip 1315, phone number 1320, a check box to indicate type of phone number 1325, credit card information 1330, expiration date of credit card 1135, the security CSC number of credit card 1340, the deposit amount 1345, and a register button 1350. In some embodiments, a link to PayPal or other payment methods in order to add PayPal account may be included. The deposit prompt 1300 may also contain legal terms of use 1355. In a non-limiting example, the legal terms may be consenting that player 102 allows credit card to be charged 1360, a "back" link embedded 1365, and an embedded help link 1370. Additionally, the deposit prompt may have a link to start over for new users 1375 and to register 1380.

Figure 14:
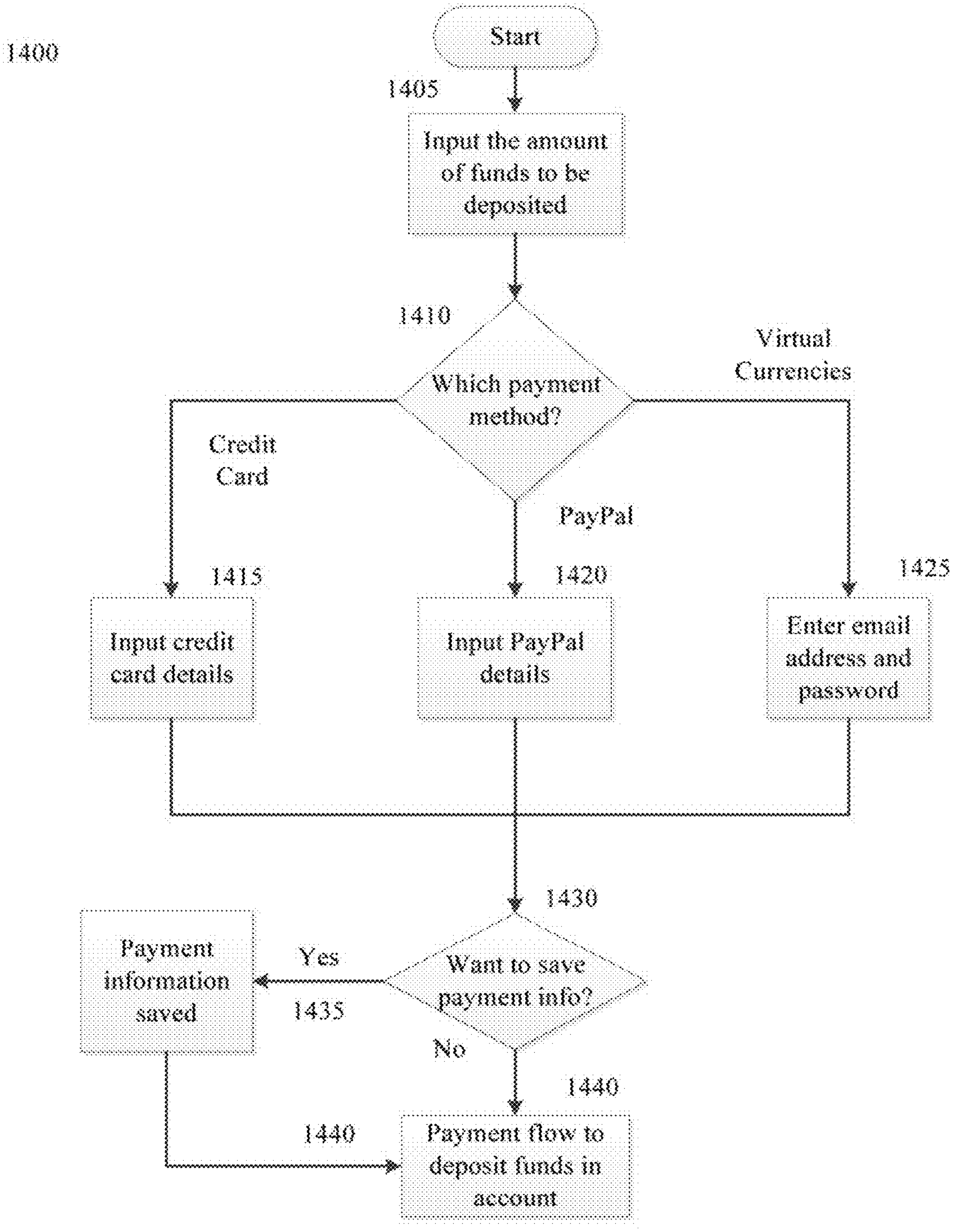
FIG. 14 is a flowchart of an exemplary method 1400 for the player deposit, in accordance with an embodiment of the present invention.

FIG. 14 is a flowchart of an exemplary method 1400 for the player deposit, in accordance with an embodiment of the present invention. A player 102, may input the amount of funds to be deposited through the deposit prompt 1300 in the amount to be deposited field 1345 in a step 1405. The player 102 may elect in a step 1410 to deposit funds using, without limitation, a credit card, PayPal, or virtual currencies. For a credit card deposit, in a step 1415, the player 102 enters credit card information. For a PayPal deposit, in a step 1420, the player 102 enters PayPal information. For a virtual currency deposit, in a step 1425, the player 102 enters their email address and password. In a non-limiting example, third parties such as, but not limited to, Stripe and PayPal may process payments into an admin bank account. The players may be credited the amount to their account. Should a player wish to withdraw a remaining amount or withdraw winnings, admin may pay out from the admin bank account. Additionally, third-party developers may be paid their % from the admin bank account as well. In a non-limiting example, a virtual currency may be Bitcoin. Once the player 102 enters their payment details, the system prompts the player 102 to save the player's payment information for future uses in a step 1430. If the player elects to have the payment information saved, in a step 1435, the SDK 104 may store the payment information. In a non-limiting example, payment information may be stored on transactional server 110 and database 230. Once the payment information is successfully stored, or if the player 102 elects not to store payment information, at a step 1440, the payment will be securely processed and authorized and credit the funds to the player's 102 account.

Figure 15:
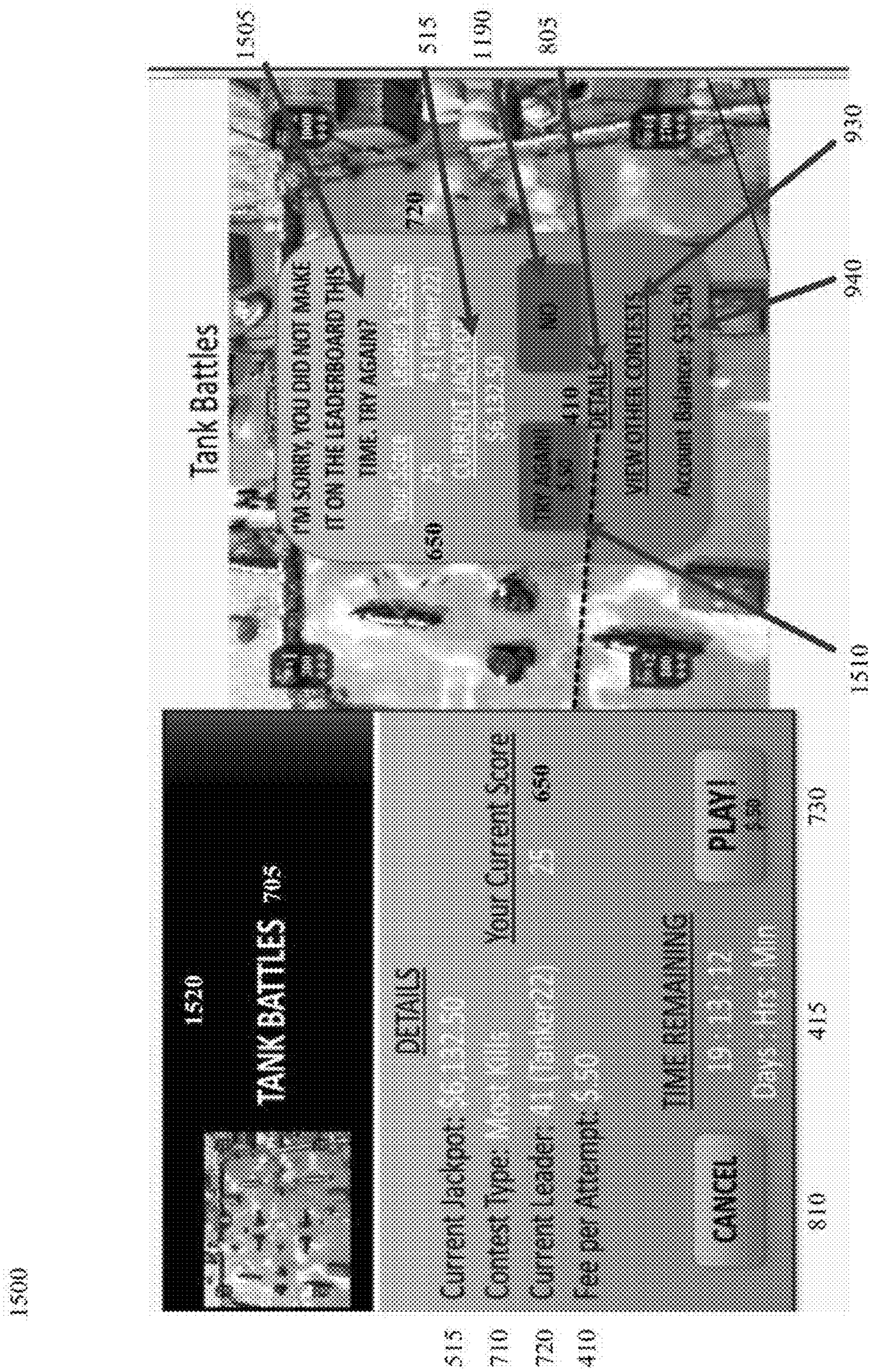
FIG. 15 illustrates a post-attempt notification display, in accordance with an embodiment of the present invention.

FIG. 15 illustrates a post-attempt notification display, in accordance with an embodiment of the present invention. In the present embodiment, the post-attempt notification display 1500 displays contest information to the player 102. The displayed information, without limitation, may include message across the top 1505, a "try again" button 1510, the attempt fee 410 to try again 1515, a "no" button 1190, view other contests 930, the player's 102 score 650, the leader's score and name 720, the current jackpot 515, the player's 102 account balance 940, and the details button 805 that triggers a detail prompt display 1520. In the present embodiment, the details display prompt 1520 may display, without limitation, the name of the game 705, the current jackpot 515, the contest type 710, the current leader score and name 720, the player's 102 current score 650, the time remaining in the contest 415, the "play" button 730, and a "cancel" button 810 to return back to the post-attempt notification display 1500.

Figure 16:
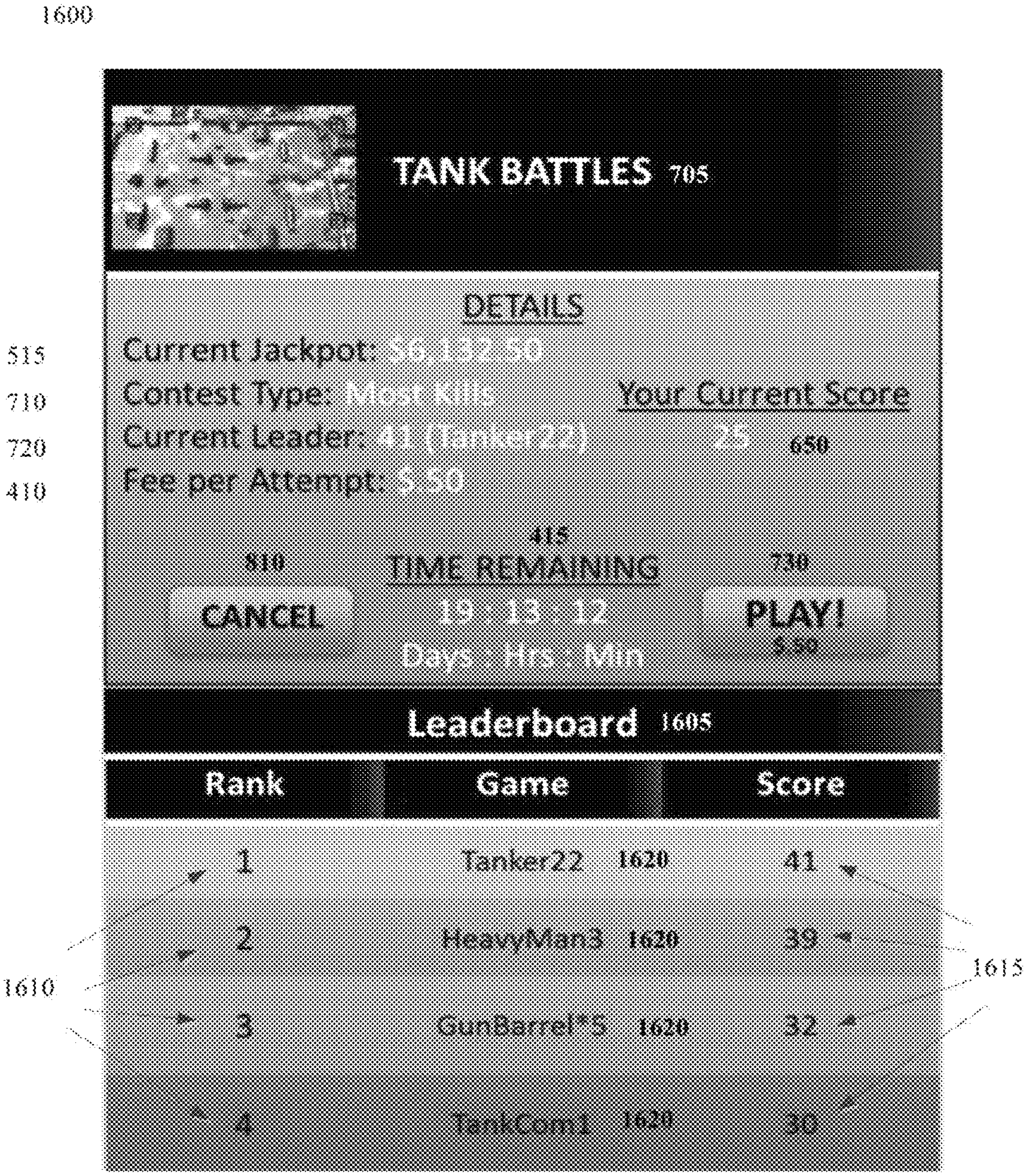
FIG. 16 illustrates an expanded contest detail and leader board notification display, in accordance with an embodiment of the present invention.

FIG. 16 illustrates an expanded contest detail and leader board notification display, in accordance with an embodiment of the present invention. In the present embodiment, the expanded contest detail and leader board notification display 1600 indicates the leader board 1605 which permits the player 102 to compare the player's current score 605 to the leader board scores 1615. The notification display 1600 displayed may, without limitation, include the game title 705, the attempt fee 410, the current jackpot 515, the contest type 710, the current leader 720 the contest time remaining 415, the "play" button 730, and a "cancel" button 810 to return to the notification prompt. The leaderboard 1605 may display, without limitation, the top four leaders 1610 displayed in order by each leader's respective score 1615 and may include the leaders username 1620.

Figure 17:
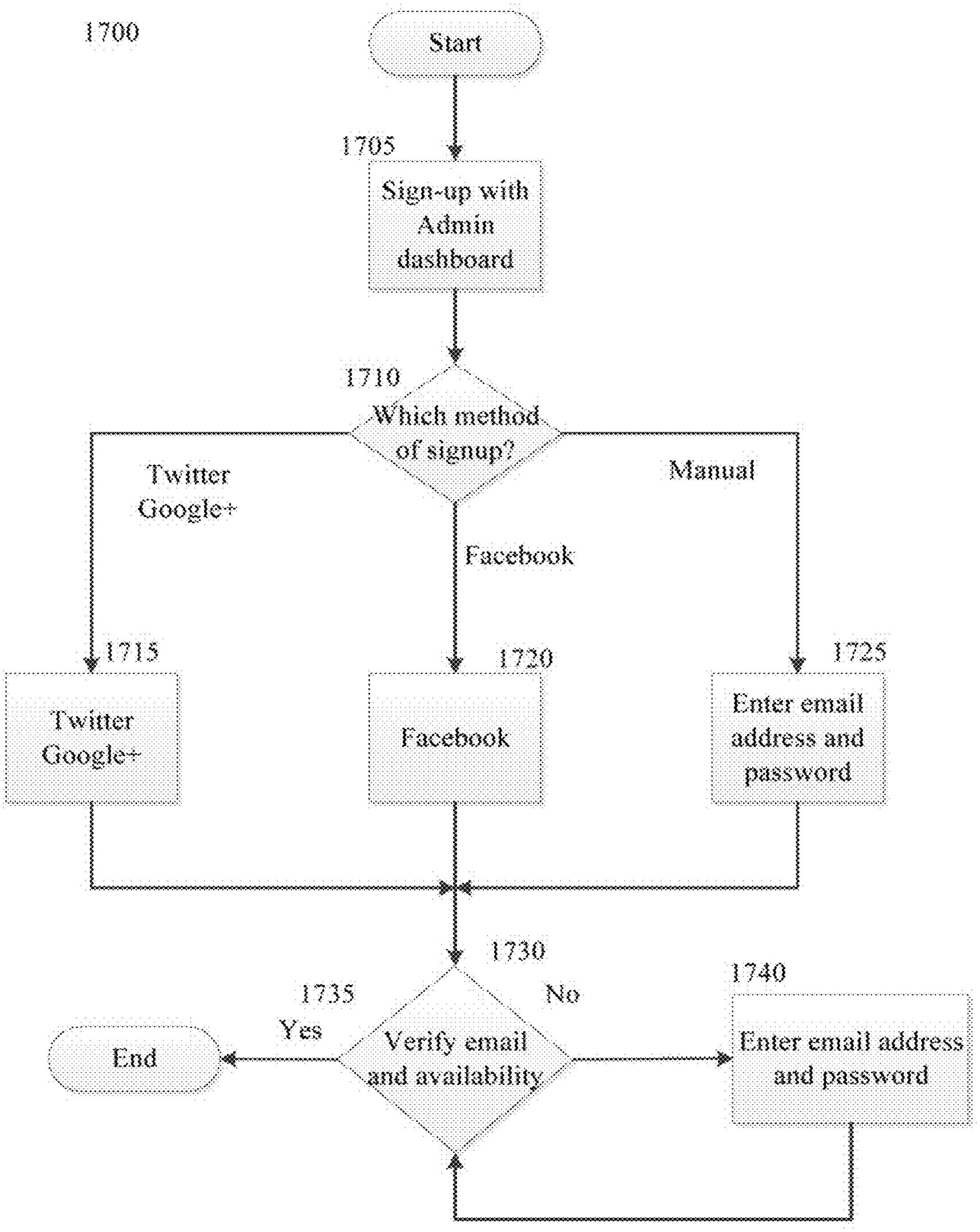
FIG. 17 is a flowchart of an exemplary method 1700 for the third-party developer account creation, in accordance with an embodiment of the present invention.

FIG. 17 is a flowchart of an exemplary method 1700 for the third-party developer account creation, in accordance with an embodiment of the present invention. In the present embodiment, a third-party developer 210 may create an account with an administrator 215 via web dashboard 220 in a step 1705. In a non-limiting example, the third-party developer 210 may create the account without the assistance of the administrator 215. The third-party developer 210 may elect to use, in a step 1710, Twitter/Google Plus in a step 1715, or, Facebook in a step 1720, or by manually entering an email and password in a step 1725 to connect to the web dashboard 220. In a non-limiting example, their Email/Facebook/Twitter/Google+ is associated with their developer account in the web dashboard which is used to connect their games with embedded SDK to their developer account in the web dashboard. The registration system, in a step 1730, may verify the email address and, if yes, in a step 1735, conclude the account creation. After the email account is verified and the developer account is created, the third-party developer 210 may add games developed by the third-party developer 210 to its developer account via the web dashboard 220. For each game added, the web dashboard 220 may generate a unique API key associated with the newly added game for the developer to embed in the game/code/script 106 along with the SDK 104 in order to sync it with the third-party developer's account in the web dashboard 220. If the email is not available or verifiable, in a step 1740, the third-party developer 210 may be prompted for email again and if available, in a step 1735 conclude the account creation.

Figure 18:
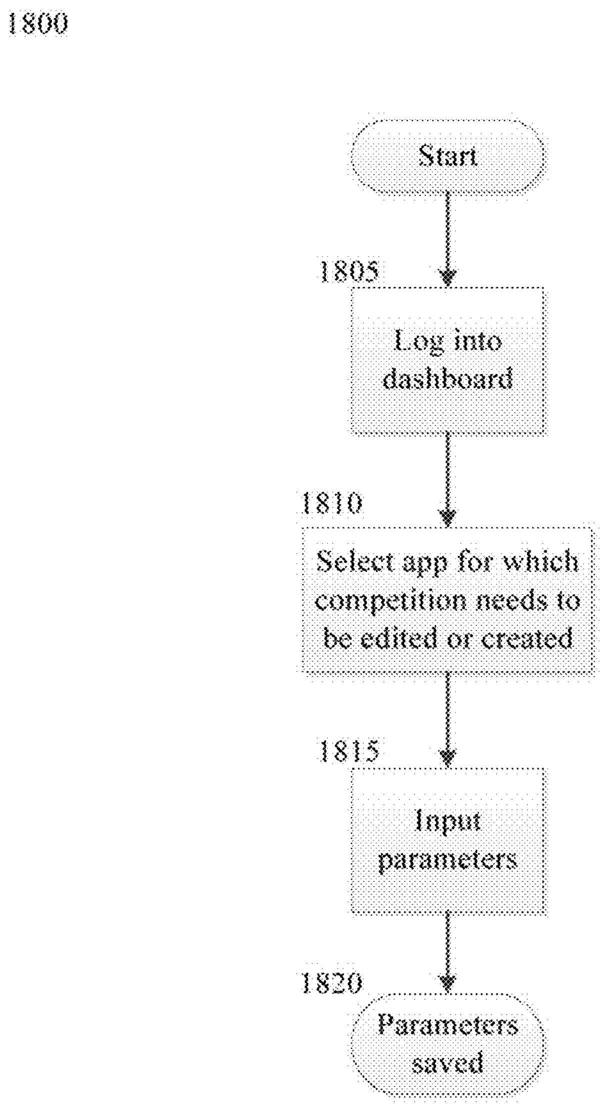
FIG. 18 is a flowchart of an exemplary method 1800 for the third-party developer creating a contest, in accordance with an embodiment of the present invention.

FIG. 18 is a flowchart of an exemplary method 1800 for the third-party developer creating a contest, in accordance with an embodiment of the present invention. In the present embodiment, the third party developer 210 logs into the API or dashboard 220 account in a step 1805. The third-party developer 210 creates and starts a contest by selecting the game/app 106 in a step 1810, and, in a step 1815, establishes the parameters for the contest. In a non-limiting example, the third-party developer 210 may establish parameters such as attempt fee amount 410, metric to guide or rank participants, results, contest type, payout structure, notifications, notification settings, and the start and end time. In another non-limiting example, the game types 710 may be most kills, most points, and fastest times. In another non-limiting example, the payout structure may be set as one winner takes all, top 5 payout, top 10 payout, or a percent of the jackpot 515 paid to any capped placing order. As a non-limiting example, a percent payout might be, 50% to 1st place, 30% to 2nd place, and 20% to 3rd place. After the third-party developer 210 has input the parameters, they are saved through the server 110 and onto the database 230, in a step 1820.

Figure 19:
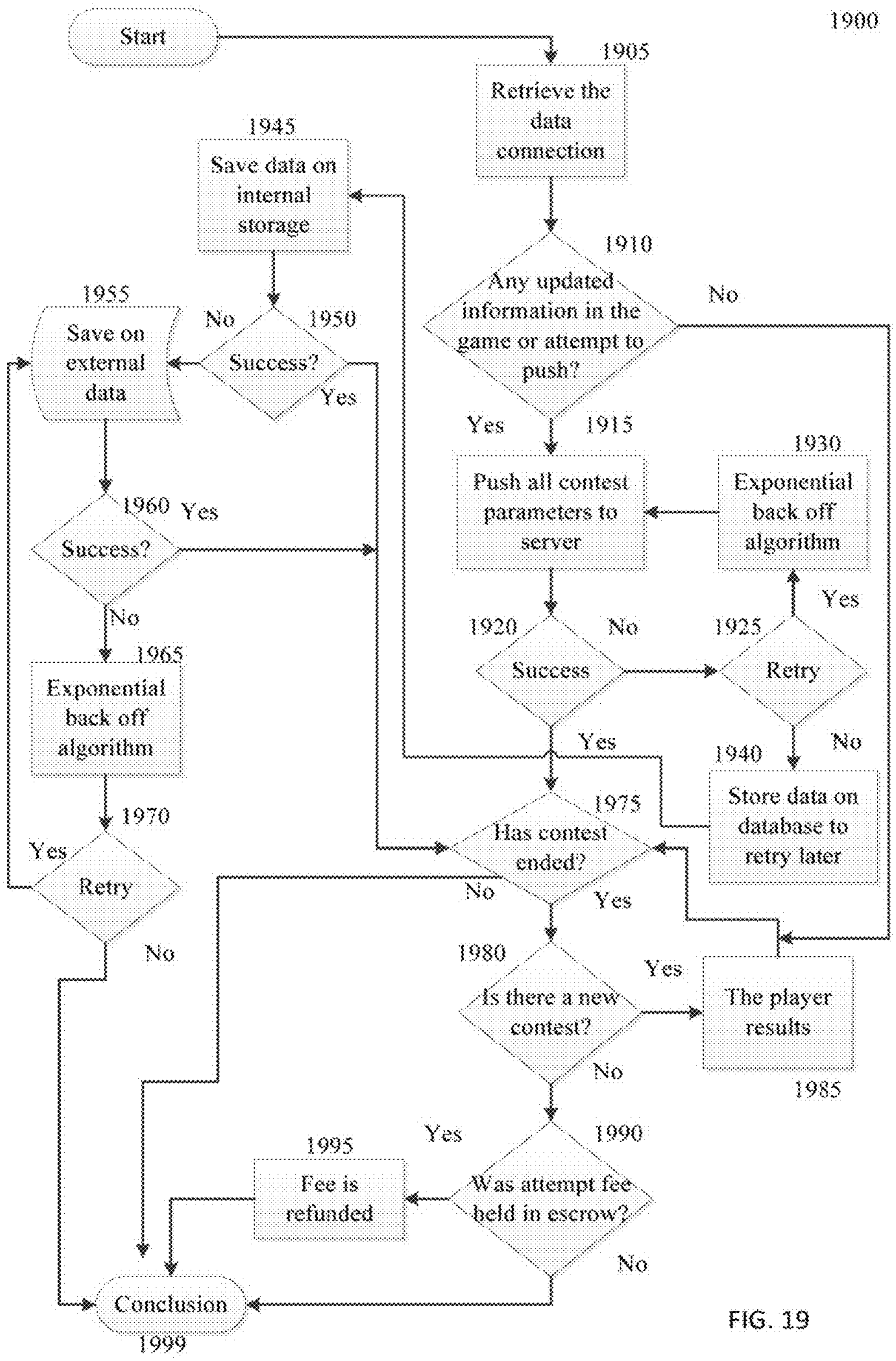
FIG. 19 is a flowchart of an exemplary method 1900 for the platform synchronization, in accordance with an embodiment of the present invention.

FIG. 19 is a flowchart of an exemplary method 1900 for the platform synchronization, in accordance with an embodiment of the present invention. In the present embodiment the SDK 104 may retrieve the data connection when a game/attempt 108 is started, in a step 1905. As a non-limiting example, the third-party developer may need to code in the game script 106 on the game server 112 to push data to the listeners (receptors) of the integrated SDK 104. The listeners in the embedded SDK 104 may be triggered and relay any relevant data to the transactional server 110. The mobile, PC, or console programming, computer code, or script 106 may push every milestone via SDK 104 that has been integrated. In a non-limiting example, milestones may include attempt started, finished attempt, current and final score, or results. In the present embodiment, the SDK 104 immediately scans for any updated information available in the game 106 and/or attempt 108 to push, in a step 1910. If the SDK 104 recognizes updated information, it attempts to push the updated milestones to the transactional server 110 in a step 1915. In alternate embodiments, the SDK 104 may push the data to the web dashboard 220 which may relay data to the transactional server 110, or the SDK 104 may push the data to the transactional server 110 which may then relay data to the web dashboard 220. If the push, in a step 1920 was successful, then the SDK 104 may check to verify if the contest 415 has ended by the time the push occurred, in a step 1975. If the contest 415 has not ended, then the platform synchronization may conclude. However, if the contest 415 has ended, the SDK 104 may verify if a new contest is available, in a step 1980. If a new contest is available, the results may be applied to the current or new contest in a step 1985 and the SDK 104 may verify if the contest has ended when pushed again, in a step 1975. If, in a step 1980, there is not a new contest and, in a step 1990, the attempt fee 410 was held in escrow, the attempt fee 410 may be refunded to the account of player 102 in a step 1995. If there is no updated information the platform synchronization may conclude in a step 1999. However, if the push, in a step 1920 was unsuccessful, the SDK 104 may retry, in a step 1925, using an exponential back off based algorithm, in a step 1930, pushing the milestone, in a step 1915. If the exponential back off based algorithm is successful, in a step 1925, then, in a step 1999, the platform synchronization may conclude. If the push still fails after the exponential back off based retries, then the data may be attempted to be stored into a secure database on the player's 102 device to retry later, in a step 1940. The data may be attempted to be saved onto the internal storage of the player's 102 device such as, without limitation, a phone, until the player 102 connects to the internet in a step 1945. If the data is not saved onto the player's 102 device, in a step 1950, the data may attempt to be saved on the external storage of the player's 102 device for a future retry, in a step 1955. If the external data save is successful in a step 1960, then when the player 102 connects to the internet, all the data waiting to be pushed and the platform synchronization concludes. If the external data save was unsuccessful, the SDK 104 may use an exponential back off based algorithm in a step 1965 to push the data and retry, in a step 1970. If the retry is unsuccessful, then the data may be stored on external storage to retry again later, in a step 1955. If the retry was successful, then the platform synchronization concludes.

Figure 20:
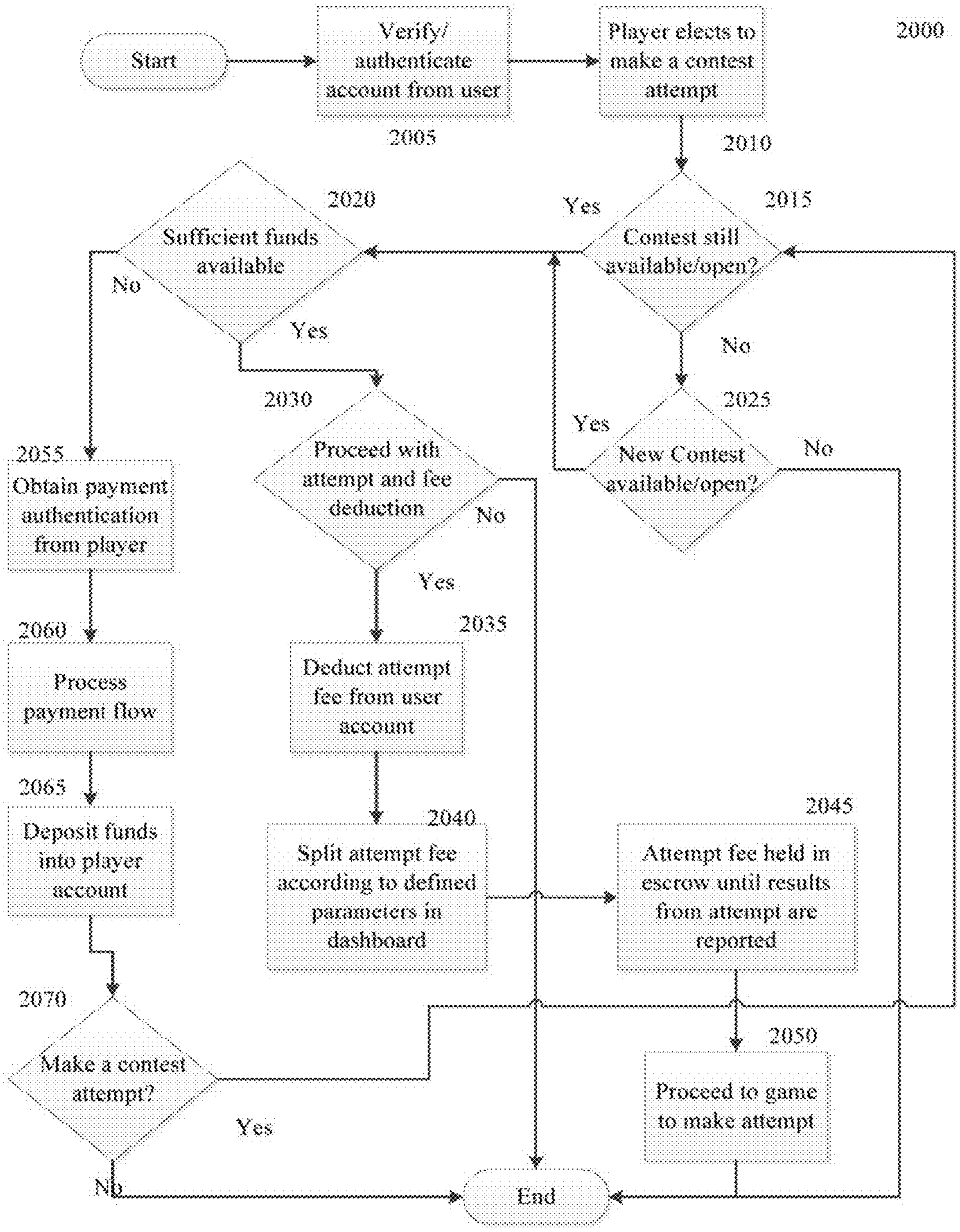
FIG. 20 is a flowchart of an exemplary method 2000 for the player participation contest, in accordance with an embodiment of the present invention.

FIG. 20 is a flowchart of an exemplary method 2000 for the player participation contest, in accordance with an embodiment of the present invention. In the present embodiment, once a player 102 receives a notification about the contest via, without limitation, a push notification, an in-game notification, email, SMS, advertisement, web dashboard 220, or social media link, the player 102 may click on the participate button. The player 102 may enter the required registration information or returning player username and password to authenticate the account information from the player 102, in a step 2005. The player 102 elects to make a contest attempt 108 in a step 2010 and if the contest 410 is still open, in a step 2015, then, the SDK 104 may verify if there sufficient funds available in the player's 102 account, in a step 2020. If the contest 410 is not open, then the SDK 104 may check for new contest availability, in a step, 2025. If a new contest is available, the SDK 104 may verify if there sufficient funds available in the player's 102 account, in a step 2020. If there is not a new contest available, the player participation concludes. If, there are sufficient funds in player's 102 account, then the player 102 may verify his or her intent to proceed with the attempt fee 410 deduction, in a step 2030. If then player 102 declines the attempt fee 410 deduction, the player participation concludes. If the player agrees to the deduction, the attempt fee 410 may be deducted from the player's 102 account, in a step 2035 and split 510 according to the defined parameters in web dashboard 220, in a step 2040. The attempt fee 410 is held in escrow 505 until the results from the attempt 108 are recorded in a step 2045 and the player 102 may proceed to the game 106 to make an attempt 108, in a step 2050. If there are not sufficient funds in a player's account, the player 102 may be sent to the deposit prompt 1300 to obtain payment authentication from the player 102, in a step 2055. The player may be taken through the payment process 1400, at a step 2060, and funds may be deposited into the player's 102 account, at a step 2065. The player 102 may be prompted to make a contest attempt 108, in a step 2070. If a contest is available, in a step 2015, then the SDK 104 may verify if there are sufficient funds available in the player's 102 account, in a step 2020 and the player 102 may verify the intent to proceed with the attempt fee 410 deduction, in a step 2030.

Figure 21:
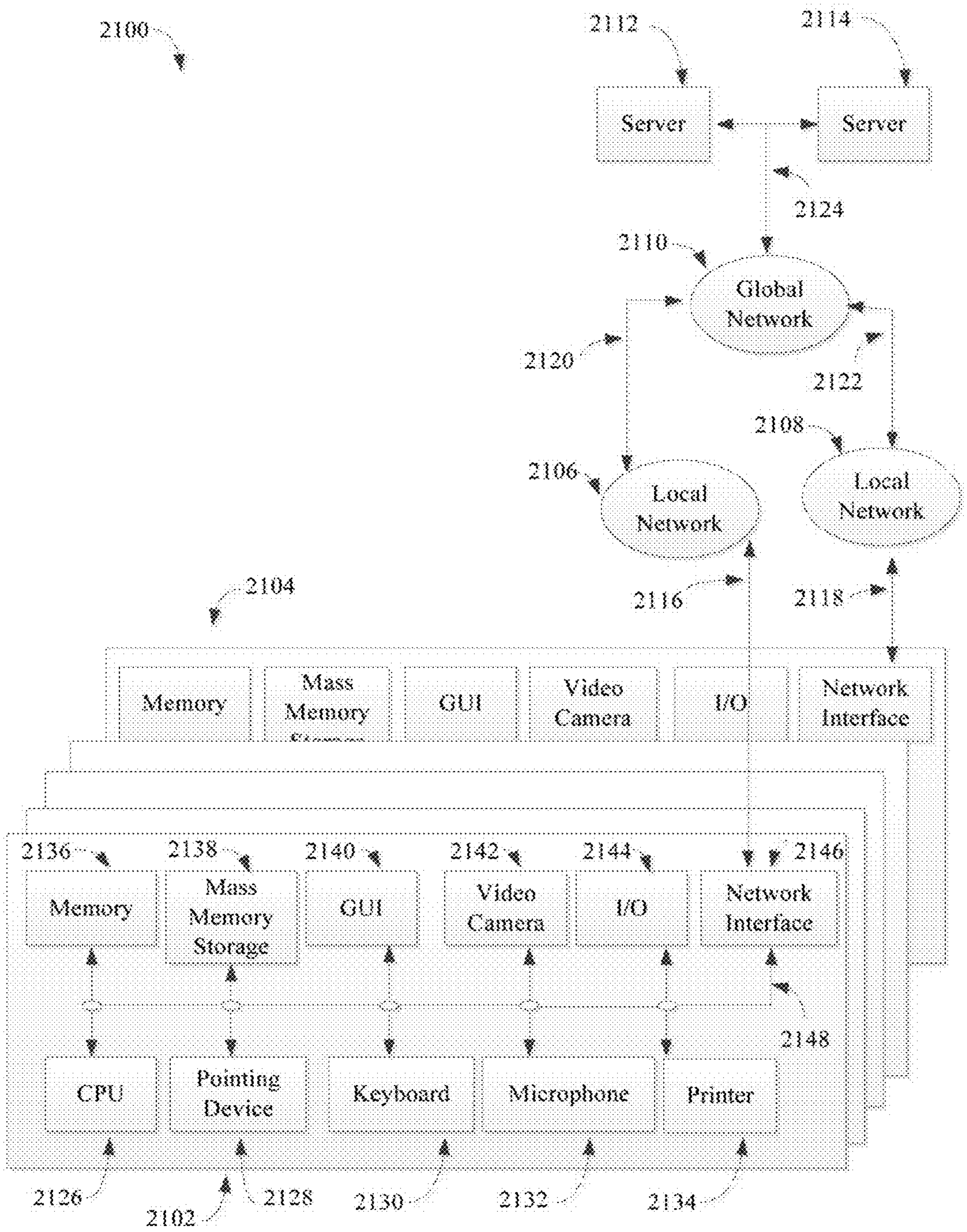
FIG. 21 is a block diagram of an exemplary client/server system 2100 which may be used by an exemplary web-enabled/networked embodiment of the present invention.

FIG. 21 is a block diagram of an exemplary client/server system 2100 which may be used by an exemplary web-enabled/networked embodiment of the present invention. A communication system 2100 includes a multiplicity of clients with a sampling of clients denoted as a client 2102 and a client 2104, a multiplicity of local networks with a sampling of networks denoted as a local network 2106 and a local network 2108, a global network 2110 and a multiplicity of servers with a sampling of servers denoted as a server 2112 and a server 2114.

Client 2102 may communicate bi-directionally with local network 2106 via a communication channel 2116. Client 2104 may communicate bi-directionally with local network 2108 via a communication channel 2118. Local network 2106 may communicate bi-directionally with global network 2110 via a communication channel 2120. Local network 2108 may communicate bi-directionally with global network 2110 via a communication channel 2122. Global network 2110 may communicate bi-directionally with server 2112 and server 2114 via a communication channel 2124. Server 2112 and server 2114 may communicate bi-directionally with each other via communication channel 2124. Furthermore, clients 2102, 2104, local networks 2106, 2108, global network 2110 and servers 2112, 2114 may each communicate bi-directionally with each other.

In one embodiment, global network 2110 may operate as the Internet. It will be understood by those skilled in the art that communication system 2100 may take many different forms. Non-limiting examples of forms for communication system 2100 include local area networks (LANs), wide area networks (WANs), wired telephone networks, wireless networks, or any other network supporting data communication between respective entities.

Clients 2102 and 2104 may take many different forms. Non-limiting examples of clients 2102 and 2104 include personal computers, personal digital assistants (PDAs), cellular phones and smartphones.

Client 2102 includes a CPU 2126, a pointing device 2128, a keyboard 2130, a microphone 2132, a printer 2134, a memory 2136, a mass memory storage 2138, a GUI 2140, a video camera 2142, an input/output interface 2144 and a network interface 2146.

CPU 2126, pointing device 2128, keyboard 2130, microphone 2132, printer 2134, memory 2136, mass memory storage 2138, GUI 2140, video camera 2142, input/output interface 2144 and network interface 2146 may communicate in a unidirectional manner or a bi-directional manner with each other via a communication channel 2148. Communication channel 2148 may be configured as a single communication channel or a multiplicity of communication channels.

CPU 2126 may be comprised of a single processor or multiple processors. CPU 2126 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 2136 is used typically to transfer data and instructions to CPU 2126 in a bi-directional manner. Memory 2136, as discussed previously, may include any suitable computer-readable media, intended for data storage, such as those described above excluding any wired or wireless transmissions unless specifically noted. Mass memory storage 2138 may also be coupled bi-directionally to CPU 2126 and provides additional data storage capacity and may include any of the computer-readable media described above. Mass memory storage 2138 may be used to store programs, data and the like and is typically a secondary storage medium such as a hard disk. It will be appreciated that the information retained within mass memory storage 2138, may, in appropriate cases, be incorporated in standard fashion as part of memory 2136 as virtual memory.

CPU 2126 may be coupled to GUI 2140. GUI 2140 enables a user to view the operation of computer operating system and software. CPU 2126 may be coupled to pointing device 2128. Non-limiting examples of pointing device 2128 include computer mouse, trackball and touchpad. Pointing device 2128 enables a user with the capability to maneuver a computer cursor about the viewing area of GUI 2140 and select areas or features in the viewing area of GUI 2140. CPU 2126 may be coupled to keyboard 2130. Keyboard 2130 enables a user with the capability to input alphanumeric textual information to CPU 2126. CPU 2126 may be coupled to microphone 2132. Microphone 2132 enables audio produced by a user to be recorded, processed and communicated by CPU 2126. CPU 2126 may be connected to printer 2134. Printer 2134 enables a user with the capability to print information to a sheet of paper. CPU 2126 may be connected to video camera 2142. Video camera 2142 enables video produced or captured by user to be recorded, processed and communicated by CPU 2126.

CPU 2126 may also be coupled to input/output interface 2144 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 2126 optionally may be coupled to network interface 2146 which enables communication with an external device such as a database or a computer or telecommunications or internet network using an external connection shown generally as communication channel 2116, which may be implemented as a hardwired or wireless communications link using suitable conventional technologies. With such a connection, CPU 2126 might receive information from the network, or might output information to a network in the course of performing the method steps described in the teachings of the present invention.

Figure 22:
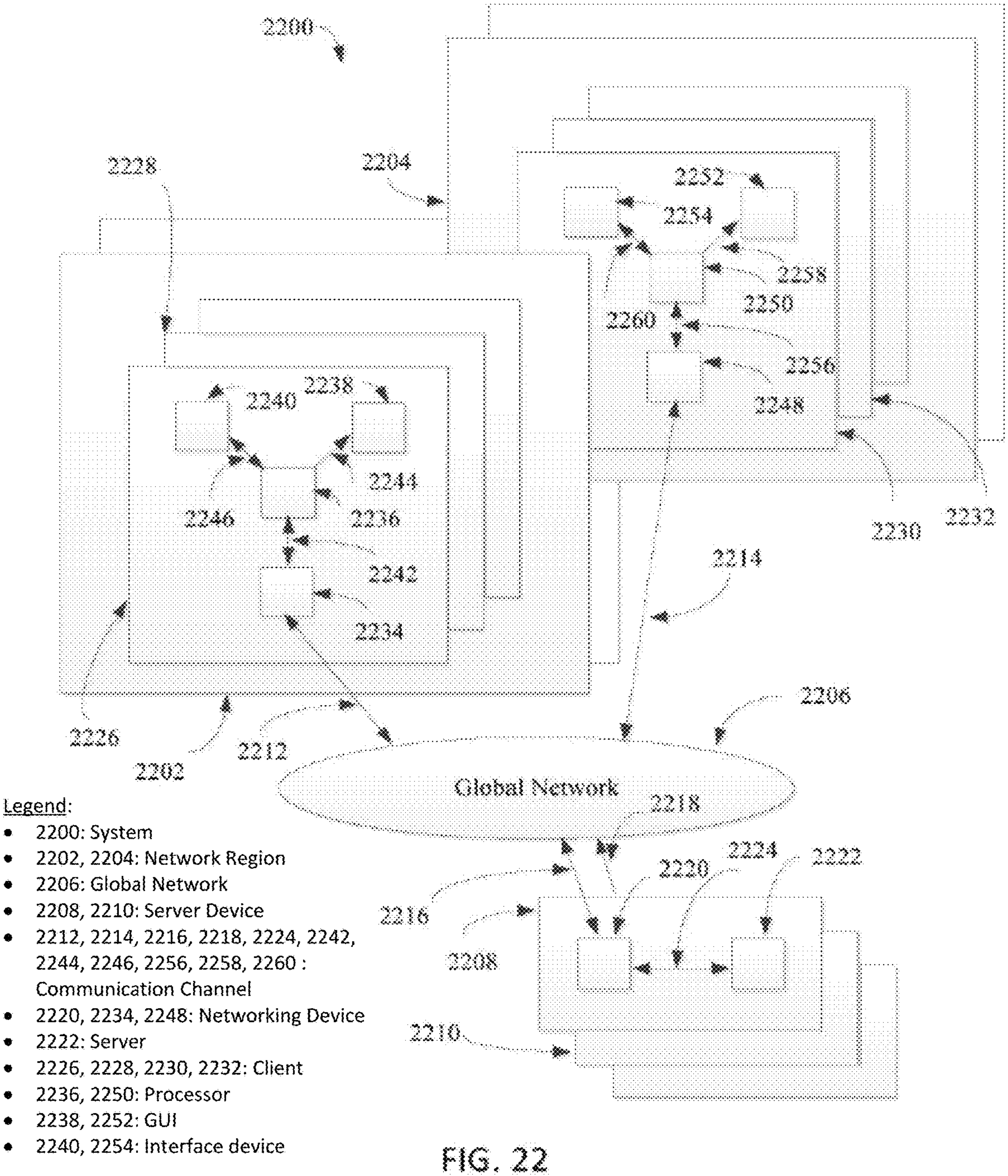
FIG. 22 is a block diagram depicting a conventional client/server communication system.

FIG. 22 is a block diagram depicting a conventional client/server communication system. A communication system 2200 includes a multiplicity of networked regions with a sampling of regions denoted as a network region 2202 and a network region 2204, a global network 2206 and a multiplicity of servers with a sampling of servers denoted as a server device 2208 and a server device 2210.

Network region 2202 and network region 2204 may operate to represent a network contained within a geographical area or region. Non-limiting examples of representations for the geographical areas for the networked regions may include postal zip codes, telephone area codes, states, counties, cities and countries. Elements within network region 2202 and 2204 may operate to communicate with external elements within other networked regions or within elements contained within the same network region.

In some implementations, global network 2206 may operate as the Internet. It will be understood by those skilled in the art that communication system 2200 may take many different forms. Non-limiting examples of forms for communication system 2200 include local area networks (LANs), wide area networks (WANs), wired telephone networks, cellular telephone networks or any other network supporting data communication between respective entities via hardwired or wireless communication networks. Global network 2206 may operate to transfer information between the various networked elements.

Server device 2208 and server device 2210 may operate to execute software instructions, store information, support database operations and communicate with other networked elements. Non-limiting examples of software and scripting languages which may be executed on server device 2208 and server device 2210 include C, C++, C# and Java.

Network region 2202 may operate to communicate bi-directionally with global network 2206 via a communication channel 2212. Network region 2204 may operate to communicate bi-directionally with global network 2206 via a communication channel 2214. Server device 2208 may operate to communicate bi-directionally with global network 2206 via a communication channel 2216. Server device 2210 may operate to communicate bi-directionally with global network 2206 via a communication channel 2218. Network region 2202 and 2204, global network 2206 and server devices 2208 and 2210 may operate to communicate with each other and with every other networked device located within communication system 2200.

Server device 2208 includes a networking device 2220 and a server 2222. Networking device 2220 may operate to communicate bi-directionally with global network 2206 via communication channel 2216 and with server 2222 via a communication channel 2224. Server 2222 may operate to execute software instructions and store information.

Network region 2202 includes a multiplicity of clients with a sampling denoted as a client 2226 and a client 2228. Client 2226 includes a networking device 2234, a processor 2236, a GUI 2238 and an interface device 2240. Non-limiting examples of devices for GUI 2238 include monitors, televisions, cellular telephones, smartphones and PDAs (Personal Digital Assistants). Non-limiting examples of interface device 2240 include pointing device, mouse, trackball, scanner and printer. Networking device 2234 may communicate bi-directionally with global network 2206 via communication channel 2212 and with processor 2236 via a communication channel 2242. GUI 2238 may receive information from processor 2236 via a communication channel 2244 for presentation to a user for viewing. Interface device 2240 may operate to send control information to processor 2236 and to receive information from processor 2236 via a communication channel 2246. Network region 2204 includes a multiplicity of clients with a sampling denoted as a client 2230 and a client 2232. Client 2230 includes a networking device 2248, a processor 2250, a GUI 2252 and an interface device 2254. Non-limiting examples of devices for GUI 2238 include monitors, televisions, cellular telephones, smartphones and PDAs (Personal Digital Assistants). Non-limiting examples of interface device 2240 include pointing devices, mousse, trackballs, scanners and printers. Networking device 2248 may communicate bi-directionally with global network 2206 via communication channel 2214 and with processor 2250 via a communication channel 2256. GUI 2252 may receive information from processor 2250 via a communication channel 2258 for presentation to a user for viewing. Interface device 2254 may operate to send control information to processor 2250 and to receive information from processor 2250 via a communication channel 2260.

For example, consider the case where a user interfacing with client 2226 may want to execute a networked application. A user may enter the IP (Internet Protocol) address for the networked application using interface device 2240. The IP address information may be communicated to processor 2236 via communication channel 2246. Processor 2236 may then communicate the IP address information to networking device 2234 via communication channel 2242. Networking device 2234 may then communicate the IP address information to global network 2206 via communication channel 2212. Global network 2206 may then communicate the IP address information to networking device 2220 of server device 2208 via communication channel 2216. Networking device 2220 may then communicate the IP address information to server 2222 via communication channel 2224. Server 2222 may receive the IP address information and after processing the IP address information may communicate return information to networking device 2220 via communication channel 2224. Networking device 2220 may communicate the return information to global network 2206 via communication channel 2216. Global network 2206 may communicate the return information to networking device 2234 via communication channel 2212. Networking device 2234 may communicate the return information to processor 2236 via communication channel 2242. Processor 2246 may communicate the return information to GUI 2238 via communication channel 2244. User may then view the return information on GUI 2238.

In the present embodiment, the software has a backend web dashboard that third-party developers 210 log into in order to manage the integration and parameters associated with their integrated game(s) 106 and contests 405. The dashboard, without limitation, may allow third-party developers 210 to perform functions such as create new contests, set parameters of contests 405, and view analytics of contests 405 held. In a non-limiting example, the third-party developer 210 may set contest metrics in determining winner, prize allocation and details. In the present embodiment, through the dashboard, the third-party developer 210 may, without limitation, set the fee per attempt amount 410 for each contest 405, adjust the percent of each attempt fee 410 that goes toward jackpot 515 and revenue split 510 by the third-party developer 210 and the administrator 215, customize jackpot notification displays in their app, send a message to all users, send in-app notifications real-time, view player analytics and other controls. The dashboard 220 may provide the administrator 215 with an executive account that oversees and manages, without limitation, all the third-party developers 210 and player 102 accounts. The administrator 215 may be able to adjust accessibility rights for all parties on the platform, including freezing or terminating third-party developer 210 accounts. The dashboard 220 also communicates with the SDK 104 and the transactional server 110 in order to maintain and display real-time data. In an alternate embodiment, dashboard 220 may communicate directly with gaming server 112.

In the present embodiment, the web dashboard may have an analytics section that allows third-party developers 210, without limitation, to view contest and user participation data through, without limitation, the number of attempts made, the amount wagered, the estimated revenue generated based on percentage set, and other metrics and graphs. In the present embodiment, the analytics section may enable players 102 to view a complete detailed profile that includes, without limitation, the player's 102 performance history, contests played, number of plays, amount wagered, attempt results and high scores, and the suggested contests and/or games based on historical data. If a player 102 has synced one of their social media accounts, for example, but not limited to, completing the sign-up process using a Facebook, Twitter, Google+ account, or any other social media account or linking a social media account in the player's 102 profile settings, the player 102 may also view their friends profiles and view how well they are performing. In some embodiments, the player 102 may also import his or her email contacts to see which of his or her friends are members and automatically connect with them via the web dashboard 220. In a non-limiting example, a social graph that ranks a users' performance(s) against his/her friends' performance(s) within different games and contests may be viewed. In another non-limiting example, players 102 may be able to view a news feed that lists integrated games & current contests with the progressive jackpot sizes across the platform. In the present embodiment, the Administrator 215 may have the highest level of visibility in the analytics section. The Administrator 215 may be enabled to find out how the system is performing on the basis of different parameters, including, without limitation the following: number of attempts 405 made by players 102, number of contests created by third-party developer 210, the total money flow, adoption rates, geographical distribution of players 102 and third-party developers 210, any exceptions or errors in the SDK 104 or web dashboard, response times of APIs, active player 102 counts, and screen wise dropouts.

In the present embodiment, the web application may immediately update the milestones in the database and may recalculate the standings of each user. In a non-limiting example, once data from an attempt 108 is received by the transactional server 110, the web dashboard 220 may then refresh to include and display the most recent attempt 108 data and most updated version of a leaderboard 1605 along with all other pertinent contest 405 information and details 1030. In the present embodiment, to synchronize the platforms, the communications may utilize https to ensure each transaction is secured through SSL certificates. When a third-party developer 210 intends to display and promote a custom version of the leaderboard of a contest, the API may be provided to the third-party developer 210 in a JSON format to use for a custom leaderboard. Otherwise, in the present embodiment, the third-party developer 210 may be provided with a generic UI to use one function of the SDK 104 to get the latest leaderboard from the server using API. In a non-limiting example, the UI leaderboard may be customizable to include colors and logo of the third-party developer 210.

In the present embodiment, a contest winner is based on the predefined rules established through the parameters. In a non-limiting example, the parameters may be start and end time, type of contest, metric used for ranking purposes such as, but not limited to, fastest time, most points, most kills, etc., and an attempt fee amount 410. The contest end is based upon the contest end-time parameter 410 with the winner(s) calculated by the web application. In alternative embodiments, the end of the contest may be based on when a player reaches a certain milestone, such as, but not limited to, a certain high score, instead of time. As a non-limiting example, first one to get 40 kills in one attempt wins the progressive jackpot amount at that point in time. The results are pushed 900 using in-app notifications 1000, push notifications and email addresses. Winner(s) account(s) may be credited with winning amount of the progressive jackpot based on the payout structure parameters 500 established in the web dashboard 220 and the associated payout with their position on the leaderboard.

In the present embodiment, players 102 may be able to share statuses such as, without limitation, a current contest with jackpot amount, performance and/or attempt score, winnings, and other messages via social media, email, and SMS.

In the present embodiment, the software automatically populates, updates, and keeps track of each contest 405 leaderboard 1605. Each attempt 108 that is reported, either by the SDK 104 or by the third party gaming server 112, is graded or ranked against all previous attempts 108 made in the contest 405, respectively. The third party gaming server 112 and/or SDK 104 know which data from the attempt 108 results to report to server 110 because the parameters of the contest 405 were defined by either the developer 210 or administrator 215 in the web dashboard 220.

In the present embodiment, the SDK 104 may be optimal for use in online and mobile games of skill. In a non-limiting example, games of skill are those in which a player 102 is ranked predominantly by in-game abilities as opposed to games whose outcomes are predominantly dependent on chance. In another non-limiting example, games of skill may include, without limitation, racing, sports, fighting, strategy, trivia, and word games.

In the present embodiment, when the contest time 415 has expired, the contest 405 closes and players 102 may not able to enter the contest 405 by making another attempt 108; however, players 102 who entered the contest 405 before the contest time expired 415 are given a preset extension of time to allow the player to finish the game attempt 108 and have the player's score reported and factored into the final leaderboard 1605 and prize ranking. The preset extension is set in web dashboard 220.

In the present embodiment, all players 102, developers 210, and administrator 215 accounts are universal amongst all integrated apps. In a non-limiting example, if a user accesses their account playing Game A, the account, such as, but not limited to, an account balance, if attempts were made, is updated and in sync when they go to play and enter contests in Game B.

In some embodiments, third party developers 210 may have the ability, via the web dashboard 220, to auto-repeat expired contests if desired or may create a new contest to begin as soon as the previous contest ends, or the option to not run a new contest at all.

In some embodiments, third party developers 210 may create custom notifications that may be designed for and delivered to a developer's 210 user base via the web dashboard 220. The custom notifications may, without limitation, notify users of updates, such as deposit bonuses, jackpot statuses and/or an ad to participate in a contest including a link that directs them to the initial verification/authentication process. Developers 210 may also set notifications to, without limitation, pop-up automatically, interstitially throughout the game/app based on defined parameters as assigned in the web dashboard 220, and/or as a notification sent out to all of the participants and users notifying them of the end of the contest 405.

In some embodiments, the software may deliver contests, notifications and updates to users via its own app, website, dashboard, or game. In a non-limiting example, users interested in learning more about different contests and games that have integrated the SDK 104 may download the app or visit the website that displays all running contests or upcoming contests in a contest lobby 700 and displays the status of each including, without limitation, the current jackpot amount 515 and the current high score and leader 720.

In some embodiments, users may be directed to the contest lobby from a notification within a third party game which has integrated the SDK 104.

In some embodiments the leaderboard 1605 is customizable by the developers 210 to help fit in with their game design.

In some embodiments, the software may have listeners embedded throughout to monitor and report user interaction data including, without limitation, metrics and trip actions that notify the SDK 104, dashboard 220, and server 110 to perform a certain action.

In some embodiments, the SDK 104 may be linked, without limitation, to online gaming sites for skill and/or chance, apps and machines, sports or events wagering, arcade games, virtual reality games, auction apps and/or website and funding platforms. In a non-limiting example, funding platforms may include crowd funding sites.

In an alternative embodiment, the SDK 104 may be linked with fantasy sports games. In a non-limiting example, Yahoo Fantasy football may be linked to create a jackpot payout for specified leaders.

In an alternative embodiment, user may register as "guests" to use the platform on a trial basis.

Figure 23:
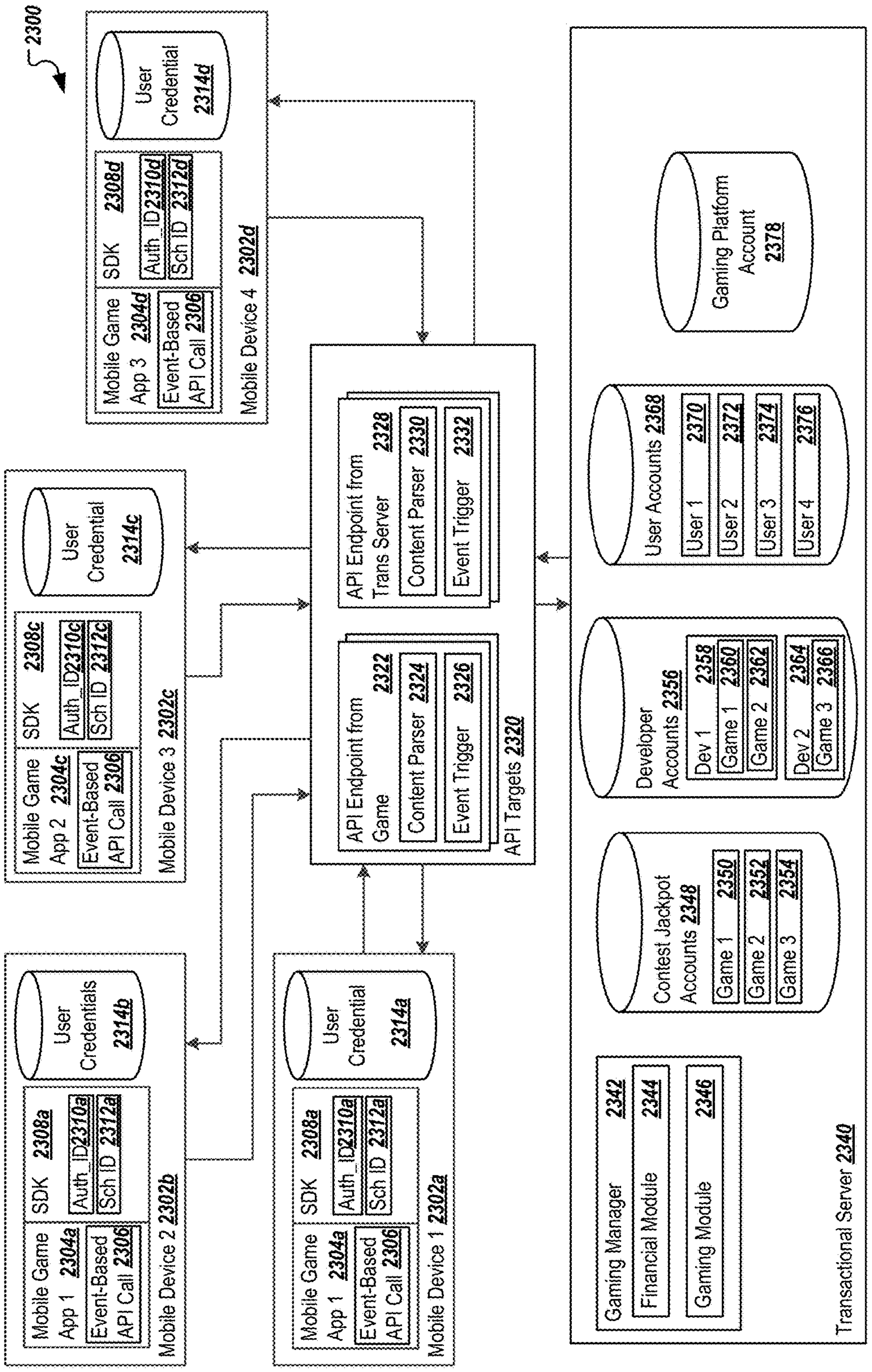
FIG. 23 is a block diagram of an exemplary system 2300 for a platform enabling the management of a plurality of games and user/developer accounts, in accordance with an embodiment of the present invention.

FIG. 23 is a block diagram of an exemplary system 2300 for a platform enabling the management of a plurality of games and user/developer accounts. In many instances, the described platform can manage and maintain multiple contests associated with a plurality of developers, users, and games. As illustrated in system 2300 of FIG. 23, a plurality of mobile devices 2302 (or alternatively, PC, console, arcade, or other suitable devices) are associated with different users, with each mobile device 2302 associated with at least one particular game. While only a single game per device is shown, different devices may include and, at different or the same times (where appropriate), may execute multiple games.

Specifically in FIG. 23, four mobile devices 2302 are shown, including mobile device 1 2302*a*, mobile device 2 2302*b*, mobile device 3 2302*c*, and mobile device 4 2302*d*. Mobile device 1 2302*a* and mobile device 2 2302*b* are illustrated as being associated with mobile game app 1 2304*a*, mobile device 3 2302*c* with mobile game app 2 2304*c*, and mobile device 4 2302*d* with mobile game app 3 2304*d*. As described, each game associated with the gaming platform may, at registration, be associated with a uniquely defined API key (here, referenced as Auth_key), where the unique API key can be used to identify or label particular contest entries as associated with the corresponding developer and game. In this way, where contest entries are received by the transactional server 2340 in a multi-game, multi-user, and/or multi-developer instance, those contest entries can be parsed, authenticated, and correctly applied to the corresponding accounts and contests.

Each of the mobile devices 2302 as illustrated can represent a mobile device (e.g., a mobile phone, tablet, laptop, etc.), as well as any other suitable gaming system, such as a PC, a Mac, an arcade system, among others. The mobile game apps 2304 may each be any suitable gaming application operable to be executed on the illustrated mobile devices 2302 (or the corresponding alternative systems). As shown, the mobile game apps 2304 may include or have embedded one or more event-based API calls 2306 in the code or programming of the app, such that in response to particular events (e.g., completion of a contest attempt, registration for a contest, request for leaderboard, etc.), the event-based API call 2306 is triggered by the mobile game app 2304 such that a suitable corresponding API request is generated and sent to a particular API target 2320. Further description of the formatting, contents, and parsing of the API requests is described in FIG. 24.

Each mobile game app 2304 is embedded with or associated with a corresponding SDK 2308, where the SDK 2308 includes an identification of the specific Auth_key 2310 and a secret scheme ID 2312, where the scheme ID 2312 is used as a secret encryption key associated with the particular mobile game app 2304. The scheme ID 2312 is known by the SDK 2308 and the backend system, e.g., the API targets 2320 and/or the transactional server 2340. As described in FIG. 24, the backend system can perform an encryption of the known Auth_key 2310 using the known scheme ID 2312 to determine if the encrypted version of the Auth_key matches what is received in the API request.

The user credentials 2314 provide an identification of or link to the user associated with a particular contest attempt and can be included in API calls/requests associated with a contest. Additionally, the user credentials 2314 can be used to direct responsive messages or notifications from the transactional server 2340 in response to requests received from those users/mobile devices 2302.

As illustrated, the event-based API calls 2306 generate API requests that are targeted to a specific API target 2320. In some instances, the set of API targets 2320 may include a plurality of API endpoints 2322, 2328, where the API endpoints 2322, 2328 correspond to the particular actions to be performed with regard to a particular contest. For example, the API endpoints 2322, 2328 may be associated with particular URLs (Uniform Resource Locater) or URIs (Uniform Resource Identifier), for example "www.jackpotrising.com/newattempt" and "www.jackpotrising.com/leaderboard," for submitting information related to a new attempt or a request for the current leaderboard, respectively. The API calls 2306 may be used to call specific API endpoints 2322 (i.e., those used to communicate from the devices 2302 to the transactional server 2340). Conversely, return communications from the transactional server 2340 may, in some instances, use a second set of API endpoints 2328, which are used to communicate from the transactional server 2340 to the particular devices 2302.

The API endpoints 2322, 2328 may include a content parser 2324, 2330 (respectively) and an event trigger 2326, 2332 (respectively). The content parsers 2324, 2330 may be used to parse and understand the subject matter of the API request received. In some instances, the content parser 2324 may perform one or more operations to authenticate particular requests, such as by validating the Auth_key 2310 received from a particular device 2302. The event triggers 2326, 2332 can perform an action associated with the specific API endpoint 2322, 2328, such as (for event trigger 2326) causing a particular operation at the transactional server 2340 to be performed or otherwise called (e.g., to submit a score to a particular contest, to provide an updated leaderboard, to register a user account, etc.). For requests sent to a particular device 2302, the event trigger 2332 may cause actions to be performed at the device 2302, such as to present a set of leaderboard data, request additional information, or notify the end user of contest information, among others. In instances of communication from the transactional server 2340 to a particular device 2302, information included in the API request sent to the API endpoint 2328 may include an identification of a particular device 2302 and/or user with which a communication is targeted, with the content parser 2330 identifying the appropriate recipient and performing the corresponding action associated with the recipient. For requests sent to the transactional server 2340, the event trigger 2326 and/or other functionality of the API endpoint 2322 can push or otherwise provide the payload of the API request (as originally received or in a reformatted or revised version) to the transactional server 2340 for incorporation in and association with the stored data of the various contests and accounts.

As illustrated, the transactional server 2340 includes a gaming manager 2342, a set of contest jackpot accounts, a set of developer accounts 2356, a set of user accounts 2368, and a gaming platform account 2378. The gaming manager 2342 is software associated with the management of the various existing contests and accounts. The portions illustrated herein are similar to those described in prior figures, and are described here for purposes of explaining the management of multiple contests associated with multiple games, developers, and users. For example, the gaming manager 2342 includes a financial module 2344 and a gaming module 2346. The gaming module 2346 manages the various contests being operated, including the contest jackpot accounts 2348 which identify that status of particular contests associated with various games.

As illustrated in FIG. 23, the contest jackpot accounts 2348 include contests for game 1 2350, game 2 2352, and game 3 2354. Additionally, information on previous and now closed contests for different games may be included in the contest jackpot accounts 2348, as well as information regarding one or more co-pending contests, such as public and private contests limited by skill, location, invitation, or other groupings. Still further, different contests for a single game may be available based on different metrics, such as one contest for highest score and one for most kills or another suitable performance metric. No specific limit for the number of contests associated with a particular game at a time is provided, as users and/or developers may initiate different types of contest with different requirements and/or participation criteria. The gaming module 2346 can perform the necessary operations to manage the continuing operation of the various contests, associating entry information received from the API endpoints 2322 with the correct contest. Further, the gaming module 2346 can, based on the information received, generate a responsive communication to confirm receipt of the information and, where appropriate, a responsive communication. For example, where a contest attempt is received for contest A of game 1, a confirmation that the entry is received and confirmed may be generated, as well as a copy of the current leaderboard or relative results of the attempt. The gaming module 2346 can send such a communication to the device 2302 associated with the attempt by sending the request to the corresponding API endpoint 2328 along with the payload of information notifying the user of the relative results of his attempt. Additional relevant information may be included in the communication, including a remaining amount of funds in the user's account, remaining time in the contest, and other relevant information. Further, similar responsive communications may be provided by the gaming manager 2342 in response to other types of communications, with the gaming manager 2342 preparing a responsive set of information and providing that information to the appropriate API endpoint 2328 for sending to the relevant device 2302.

The financial module 2344 of the gaming manager 2342 can be used to manage the financial aspects of the various contests, including managing the funds associated with current jackpots associated with various contests, transferring user funds from the user accounts 2368 to the developer accounts 2356 associated with the game in which a contest attempt is made, as well as to the gaming platform account 2378 managing the contests. The developer accounts 2356 may include one or more accounts associated with each developer (e.g., accounts for developer 1 2358 and developer 2 2364) registered with the gaming platform. For simpler maintenance of funds, each game registered by a developer may be associated with its own game account, with each game account tied to a particular developer. Alternatively, funds for the various games of a particular developer may be comingled with an account or ledger maintained for accounting purposes. As illustrated in FIG. 23, developer 1 2358 is associated with two accounts for different games, game app 1 account 2360 and game app 2 account 2362, while developer 2 2364 is associated with a single game, game app 3 account 2366. When attempts are received for game app 1 2304*a* or game app 2 2304*c*, the financial module 2344 credits the developer accordingly based on the predetermined splitting of content attempt fees with the gaming platform to the corresponding account. Similarly, the appropriate funds are also deposited into the gaming platform account 2378 based on that split. In some instances, these accounts may be used as accounting ledgers, with the actual funds being provided and transferred outside of the transactional server 2340.

User accounts 2368 can be created in response to users registering with the gaming platform. When incoming contest attempts are received, the user credentials 2314 associated with the attempt can be matched to a particular user account (e.g., user 1 account 2370, user 2 account 2372, user 3 account 2374, and user 4 account 2376), with funds from the corresponding account being transferred by the financial module 2344, in the correct splits, to the appropriate developer account and the gaming platform account 2378. The financial module 2344 and the gaming module 2346 therefore work in combination to manage and operate the various contests while interpreting, acting upon, and responding to contest-related requests from the devices 2302.

Figure 24:
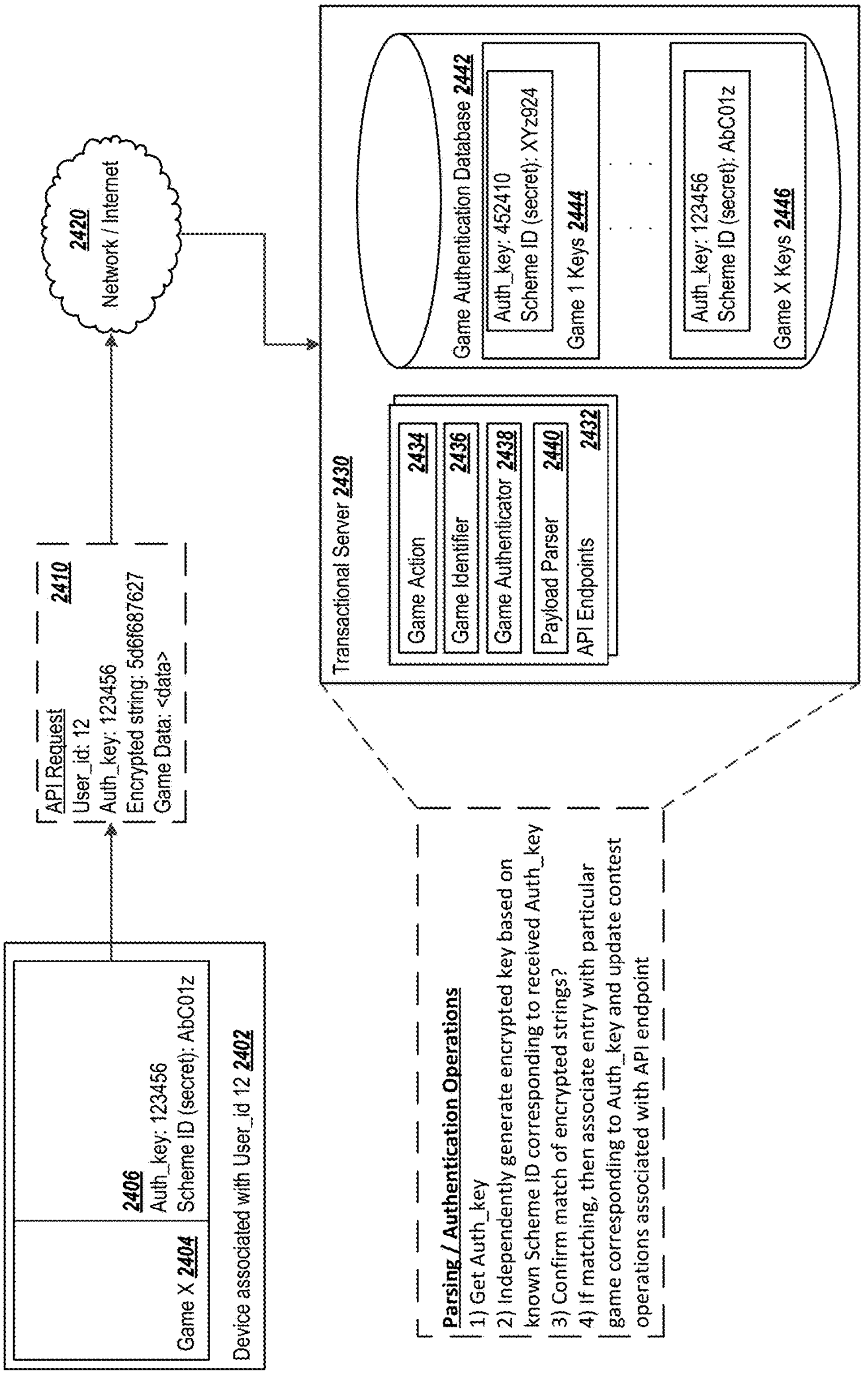
FIG. 24 is an illustrated flowchart of an exemplary flow 2400 for authenticating API requests associated with particular game entries at a common set of API endpoints, in accordance with an embodiment of the present invention.

FIG. 24 is an illustrated flowchart of an exemplary flow 2400 for authenticating API requests associated with particular game entries at a common set of API endpoints. Specifically, FIG. 24 illustrates how a particular API request from a specific device 2402 and associated with a particular game 2404 are recognized and parsed at the API targets and/or the transactional server 2430.

As illustrated, a device associated with User_id 12 (2402) includes and has installed game X 2404. Game X 2404 has previously been registered with the gaming platform, and as such, has embedded and incorporated the SDK 2406, which including information on an Auth_key and a scheme ID specific to the particular registration of Game X 2404. In other words, the gaming platform has provided two specific identifiers to Game X 2404, a public identifier—an Auth_key of value "123456"—and a private, secret identifier—a scheme ID of value "AbC01z." The public identifier may be an authentication token or a public/shared key. The secret identifier is provided to the developer upon registration and integrated into the code of the game, and is considered a secret key. The secret key is stored on both the device 2402 and the transactional server 2430, and is not passed in any API call or request in order to maintain its secrecy.

In response to an action associated with a contest, the operations of Game X 2404 generate an API request 2410 to be sent to an API endpoint 2432 corresponding to the contest action. The particular API endpoint 2432 to which the API request is to be sent may also be hard-coded or included in the code of Game X 2404, such that the appropriate API is called in response to the contest action. The API request 2410 generated includes information identifying the particular user associated with the contest action (here, User_id of "12"), the public Auth_key value (here, value of "123456"), an encrypted string (here, "5d6f687627"), and a set of game action related data associated with the action being requested. The game action related data may be the result of an attempt, an indication or parameter associated with a request for information, or any other suitable information associated with the game action and relevant to the action to be performed at the transactional server 2430. Further, instead of sending the secret key of the scheme ID, a string (i.e., the known public Auth_key value) is encrypted using the secret scheme key to generate a hash value. Without the scheme key, a validation of the encrypted string and its hash value is not possible. As illustrated, the API request 2410 can be sent via any suitable communications medium, including the Internet, an Intranet, or any suitable network 2420.

The API request 2410 is received at the API endpoint 2432 to which it is directed. The API endpoints 2432 may include any number of modules and operations, including those illustrated. In FIG. 24, the API endpoints 2432 are illustrated as including a game action module 2434, a game identifier module 2436, a game authenticator module 2438, and a payload parser 2440. The game action module 2434 may be specifically associated with the API endpoint 2432, such that API requests 2410 received at the particular API endpoint 2432 are associated with a particular action at the transactional server 2430. For example, each API request received at a particular API endpoint 2432 may be associated with contest attempts being made and submitted to the transactional server 2430. In those instances, that API endpoint 2432 may perform the operations associated with sending those scores to the appropriate game, which can also perform operations for transferring the attempt fees from a user account associated with the User_ID of the party associated with the attempt into the accounts of the developer associated with the game and an account associated with the gaming platform. To manage the application of the requested actions, the game identifier module 2436 and the game authenticator module 2438 are used.

The game identifier module 2436 can use the Auth_key included in the API request 2410 to identify a game associated with the request. Additional techniques may be used to identify a particular contest for the game with which to associate the attempt. Specifically, the Auth_key received is matched to a table or listing stored at or referenced by the transaction server 2430 to determine with which game the request is associated. Along with the identification of the corresponding game, the stored secret scheme ID associated with the identified Auth_key is located. The game authenticator module 2438 then independently performs a function identical to the generation of the encrypted string performed by the device 2402 by encrypting the Auth_key using the stored scheme ID to generate a second hash. A determination is made as to whether the received encrypted string or hash value matches the independently generated encrypted string or hash created at the transactional server 2430. If a match is confirmed, then the API request is authenticated as associated with the game corresponding to the received Auth_key, and the particular contest action as defined by the game action module 2434 can be performed. The payload parser 2440 can manage the game data and payload information to ensure the correct information is passed to the transactional server 2430 and its gaming operations after the authentication is complete.

As illustrated, the game authentication database 2442 is used to store information on the generated keys associated with each game. For example, as shown, a Game 1 includes a set of keys 2444, the Auth_key with a value of "452410" and a scheme ID with a value of "Xyz924". The stored keys 2446 of Game X, of course, match the keys embedded within game X 2404 and its SDK 2406.

FIG. 25 is a flowchart of an exemplary method 2500 for developer creation of a new private or public contest. At least some of the operations in FIG. 25 may be similar to or a variation of the operations described in FIG. 18. At 2505, a new contest is created by the developer. To create the new contest, the third party developer may log into a web dashboard, mobile app or application, or a variety of other management interface tools, and select a game that has been integrated into the gaming platform associated with their developer account (as tracked, for instance, by a unique Game ID or Auth_key and a developer ID), and can create a contest within that particular game or app. At 2510, a unique contest ID is created in order to, in a non-limiting example, assign the contest ID to that particular game (as associated with the Auth_key of the game, for example) and developer (as associated with the developer ID) in addition to tracking overall user participation associated with that contest ID.

At 2515, the developer may establish the parameters for the contest. In a non-limiting example, the developer may establish parameters such as attempt fee amount, one or more metrics to guide or rank participants, results, contest type, payout structure, notifications, notification settings, and the start and end time. In another non-limiting example, the game types may be most kills, most points, and fastest times. In another non-limiting example, the payout structure may be set as one winner takes all, top 5 payout, top 10 payout, or a percent of the jackpot paid to any capped placing order. As a non-limiting example, a percent payout might be, 50% to 1st place, 30% to 2nd place, and 20% to 3rd place. After the developer has input the parameters, they are saved through the transactional server and into a database or other storage managing contest information.

Once contest parameters are established, the developer may elect to make the contest public or private at 2520. If developer elects to initiate the contest as a public contest at 2520, the contest is created where all users of that game and/or the gaming platform will be able to access and participate in the contest when the contest starts. If the developer elects to initiate the contest as a private contest at 2520, the developer can then establish private access authentication parameters that may restrict which users can participate, for example, a user must have a password or code to participate or be located in a specific geographical region. Private access authentication parameters include but are not limited to passwords, codes, user location, user skill or experience level, access through a private link, or invitation via a variety of different methods including social media networks. Once private access authentication parameters are established at 2530, the developer can then finalize the creation of the private contest at 2535.

FIG. 26 is a flowchart of an exemplary method 2600 for user creation of a new private or public contest. At least some of the operations in FIG. 26 may be similar to or a variation of the operations described in FIG. 18. At 2605, a new contest is created by the user. To create the new contest, the user may log into a web dashboard, mobile app, or a variety of other management interface tool, select a particular game that is integrated on the system and can create a contest within that particular game/app. At 2610, a unique contest ID is created in order to, in a non-limiting example, assign the contest ID to that particular game and respective developer (owner of said game) in addition to tracking overall user participation associated with that contest ID.

At 2615, the user may establish the parameters for the contest. In a non-limiting example, the user may establish parameters such as attempt fee amount, a metric to guide or rank participants, results, contest type, payout structure, notifications, notification settings, and the start and end time. In another non-limiting example, the game types may be most kills, most points, and fastest times. In another non-limiting example, the payout structure may be set as one winner takes all, top 5 payout, top 10 payout, or a percent of the jackpot paid to any capped placing order. As a non-limiting example, a percent payout might be, 50% to 1st place, 30% to 2nd place, and 20% to 3rd place. After the user has input the parameters, they are saved through the transactional server and into a database or other storage managing contest information.

Once contest parameters are established, the user may elect to make the contest public or private at 2620. If user elects to initiate the contest as a public contest at 2620, the contest is created where all users of that game and/or of the contest platform will be able to access and participate in the contest when the contest starts. If the user elects to initiate the contest as a private contest at 2620, the user can then establish private access authentication parameters that may restrict which users can participate, for example, users entering the contest must have a password or code to participate or be located in a specific geographical region. Private access authentication parameters include but are not limited to passwords, codes, user location, user skill or experience level, access through a private link, or invitation via a variety of different methods including social media networks. Once private access authentication parameters are established at 2630, the user can then finalize the creation of the private contest at 2635.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: web site hosting and cloud storage for databases.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO' s Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO' s Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a mobile-gaming platform according to the present invention will be apparent to those skilled in the art. Various aspects of the invention have been described above by way of illustration, and the specific embodiments disclosed are not intended to limit the invention to the particular forms disclosed. The particular implementation of the mobile-gaming platform may vary depending upon the particular context or application. By way of example, and not limitation, the a mobile-gaming platform described in the foregoing were principally directed to third-party developer integration implementations; however, similar techniques may instead be applied to third-party developer integrations for Microsoft X-box® and Sony Play Station® gaming, which implementations of the present invention are contemplated as within the scope of the present invention. Furthermore, the teachings of the present invention are not limited to any particular SDK and may include any suitable framework for integrating a contest with a game. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:

providing a first electronic game embodied on a non-transitory computer-readable medium, the first game implementing a contest framework, said first game configured to monitor interactions during a play of said first game via one or more interfaces embedded within the first game, the one or more interfaces of the first game configured to communicate with a transactional server via one or more application programming interfaces (API) calls to a plurality of API endpoints, wherein the one or more interfaces transmit calls to particular API endpoints associated with a particular contest action, each call including at least a game identifier and a user identifier associated with a particular call, and wherein the first game is further configured to display notifications from said transactional server;

providing the plurality of API endpoints, each API endpoint associated with a particular contest action, wherein each of the API endpoints initiates a corresponding particular contest action associated with first game based on the game identifier to be performed at the transactional server in response to an API call from the one or more interfaces of the first electronic game; and providing said transactional server, said transactional server configured to:

manage one or more contests associated with one or more different games, each particular game associated with a unique game identifier and corresponding to at least one particular contest associated with the particular game, each of the at least one particular contest associated with a defined contest period during which valid contest attempts can be submitted for the particular contest, the transactional server configured to receive a number of contest actions from the plurality of API endpoints associated with contest attempts from a number of players for one or more of the at least one particular contests;

process received interactions from the one or more interfaces of the first game via the plurality of API endpoints in conjunction with at least one contest associated with said first game based on the at least one particular unique game identifier associated with the received interactions;

communicate notifications regarding said processing to the one or more interfaces of the first game; and automatically update results associated with the particular contest in response to receiving the processed interactions.

2. The method of claim 1, wherein the game identifier comprises an application programming interface (API) key.

3. The method of claim 1, wherein at least one of the API endpoints is associated with causing a contest attempt fee to be debited, where the contest attempt fee is debited from a user account associated with the user identifier.

4. The method of claim 1, wherein each game is associated with one or more unique keys embedded within the particular game, and where the game identifier included in the API call includes at least one of the unique keys associated with the particular game.

5. The method of claim 1, wherein each game is associated with a unique authorization key and a secret key embedded within the particular game, and where the game identifier including in the API call includes the unique authorization key associated with the particular game and an encrypted string generated by encrypting the unique authorization key associated with the particular game with the secret key using a first encryption function, and where each API endpoint is associated with a game authentication module that independently performs the first encryption function on the unique authorization key associated with game identifier by a copy of the secret key associated with the unique authorization key stored at the transactional server, wherein the game authentication module compares the result of the first encryption function performed at the game authentication module to the encrypted string included in the game identifier, and wherein the particular contest action associated with the API endpoint is only performed if the result of the first encryption function performed at the game authentication module matches the encrypted string.

6. The method of claim 1, wherein the defined contest period comprises a defined contest time period, and wherein each particular contest is completed at the end of the defined contest time period associated with the particular contest.

7. The method of claim 1, in which the contest actions are associated with attempts at playing the first game and providing results of playing said first game to the transactional server.

8. The method of claim 1, in which said transactional server is further configured to:

evaluate each contest attempt of said first game based on at least one of a best score, most kills, fastest time, longest play attempt duration, and highest level reached;

rank results of the contest attempts based on the evaluation; and escrow fees for attempts at playing said first game and allocating revenue for each attempt at playing said first game.

9. The method of claim 1, wherein the first game is executed on a PC, a Mac, a gaming console, an arcade system, or a mobile device.

10. The method of claim 1, wherein the received interactions are associated with multiple instances of the first game executing on different devices, each instance associated with a different user.

11. The method of claim 1, wherein the received interactions are associated with multiple different games, each received interaction associated with a particular unique identifier corresponding to a particular contest associated with a particular one of the one or more different games.

12. The method of claim 1, wherein the transactional server is a game server.

13. A system comprising:

a first electronic game implemented with a contest framework, the first game embodied on a non-transitory computer-readable medium and executable by at least one hardware processor, the first game configured to monitor interactions during a play of said first game via one or more interfaces embedded within the first game, the one or more interfaces of the first game configured to communicate with a transactional server via one or more application programming interfaces (API) calls to a plurality of API endpoints, wherein the one or more interfaces transmit calls to particular API endpoints associated with a particular contest action, each call including at least a game identifier and a user identifier associated with a particular call, and wherein the first game is further configured to display notifications from said transactional server;

the plurality of API endpoints, wherein each API endpoint is associated with a particular contest action, wherein each of the API endpoints are configured to initiate a corresponding particular contest action associated with first game based on the game identifier to be performed at the transactional server in response to an API call from the one or more interfaces of the first electronic game; and the transactional server configured to:

manage one or more contests associated with one or more different games, each particular game associated with a unique game identifier and corresponding to at least one particular contest associated with the particular game, each of the at least one particular contest associated with a defined contest period during which valid contest attempts can be submitted for the particular contest, the transactional server configured to receive a number of contest actions from the plurality of API endpoints associated with contest attempts from a number of players for one or more of the at least one particular contests;

process received interactions from the one or more interfaces of the first game via the plurality of API endpoints in conjunction with at least one contest associated with said first game based on the at least one particular unique game identifier associated with the received interactions;

communicate notifications regarding said processing to the one or more interfaces of the first game; and automatically update results associated with the particular contest in response to receiving the processed interactions.

14. The system of claim 13, wherein the game identifier comprises an application programming interface (API) key.

15. The system of claim 13, wherein at least one of the API endpoints is associated with causing a contest attempt fee to be debited, where the contest attempt fee is debited from a user account associated with the user identifier.

16. The system of claim 13, wherein each game is associated with one or more unique keys embedded within the particular game, and where the game identifier included in the API call includes at least one of the unique keys associated with the particular game.

17. The system of claim 13, wherein each game is associated with a unique authorization key and a secret key embedded within the particular game, and where the game identifier including in the API call includes the unique authorization key associated with the particular game and an encrypted string generated by encrypting the unique authorization key associated with the particular game with the secret key using a first encryption function, and where each API endpoint is associated with a game authentication module that independently performs the first encryption function on the unique authorization key associated with game identifier by a copy of the secret key associated with the unique authorization key stored at the transactional server, wherein the game authentication module compares the result of the first encryption function performed at the game authentication module to the encrypted string included in the game identifier, and wherein the particular contest action associated with the API endpoint is only performed if the result of the first encryption function performed at the game authentication module matches the encrypted string.

18. The system of claim 13, wherein the defined contest period comprises a defined contest time period, and wherein each particular contest is completed at the end of the defined contest time period associated with the particular contest.

19. The system of claim 13, in which the contest actions are associated with attempts at playing the first game and providing results of playing said first game to the transactional server.

20. The system of claim 13, in which said transactional server is further configured to:

evaluate each contest attempt of said first game based on at least one of a best score, most kills, fastest time, longest play attempt duration, and highest level reached;

rank results of the contest attempts based on the evaluation; and escrow fees for attempts at playing said first game and allocating revenue for each attempt at playing said first game.

21. The system of claim 13, wherein the first game is executed on a PC, a Mac, a gaming console, an arcade system, or a mobile device.

22. The system of claim 13, wherein the received interactions are associated with multiple instances of the first game executing on different devices, each instance associated with a different user.

23. The system of claim 13, wherein the received interactions are associated with multiple different games, each received interaction associated with a particular unique identifier corresponding to a particular contest associated with a particular one of the one or more different games.

24. The system of claim 13, wherein the transactional server is a game server.

25. A method comprising the steps of:

providing a first electronic game embodied on a non-transitory computer-readable medium, the first game implementing a contest framework, said first game configured to: (i) communicate with a transactional server, (ii) monitor interactions during a play of said first game via one or more interfaces embedded within the first game, the one or more interfaces of the first game configured to monitor the interactions and communicate information associated with the monitored interactions to the transactional server, and (iii) display notifications from said transactional server; and providing said transactional server, said transactional server configured to:

manage one or more jackpot contests associated with one or more different games, each particular game associated with a unique identifier corresponding to at least one particular jackpot contest associated with the particular game, each particular jackpot contest associated with a defined contest period during which valid contest attempts can be submitted, the transactional server configured to receive, during the defined contest period, a number of contest attempts from a number of players for the particular jackpot contest, wherein each particular jackpot contest is completed at the end of the defined contest period associated with the particular jackpot contest;

process received interactions from the one or more interfaces of the first game in conjunction with at least one jackpot contest associated with said first game based on the at least one particular unique identifier associated with the received interactions;

communicate notifications regarding said processing to the one or more interfaces of the first game; and automatically update results associated with the particular jackpot contest in response to receiving the information on the monitored interactions.

26. The method as recited in claim 25, wherein the unique identifier comprises an application programming interface (API) key.

27. The method as recited in claim 25, in which said interactions comprise attempts at playing said first game and results of playing said first game, in which each jackpot contest is associated with a set of parameters, each set of parameters including at least an amount of fee for attempting play of said first game, an allocation of collected fees associated with said jackpot contest, and a duration of said jackpot contest, and in which said notifications comprise at least one of a status regarding said jackpot contest, a status of escrowed fees, and results of said ranking.

28. The method as recited in claim 25, in which said transactional server is further configured to:

evaluate each contest attempt of said first game based on at least one of a highest score, most kills, fastest time, longest play attempt duration, and highest level reached;

rank results of the contest attempts based on the evaluation; and escrow fees for attempts at playing said first game and allocating revenue for each attempt at playing said first game.

29. The method as recited in claim 25, wherein the defined contest period comprises a defined contest time period, and wherein each particular contest is completed at the end of the defined contest time period associated with the particular contest.

30. A system comprising:

a first electronic game implemented with a contest framework, the first game embodied on a non-transitory computer-readable medium and executable by at least one hardware processor, the first game configured to:

communicate with a transactional server;

monitor interactions during a play of said first game via one or more interfaces embedded within the first game, the one or more interfaces of the first game configured to monitor the interactions and communicate information associated with the monitored interactions to the transactional server; and display notifications from said transactional server; and the transactional server configured to:

manage one or more jackpot contests associated with one or more different games, each particular game associated with a unique identifier corresponding to at least one particular jackpot contest associated with the particular game, each particular jackpot contest associated with a defined contest period during which valid contest attempts can be submitted, the transactional server configured to receive, during the defined contest period, a number of contest attempts from a number of players for the particular jackpot contest, wherein each particular jackpot contest is completed at the end of the defined contest period associated with the particular jackpot contest;

process received interactions from the one or more interfaces of the first game in conjunction with at least one jackpot associated with said first game based on the at least one particular unique identifier associated with the received interactions;

communicate notifications regarding said processing to the one or more interfaces of the first game; and automatically update results associated with the particular jackpot contest in response to receiving the information on the monitored interactions.

31. The system as recited in claim 30, wherein the unique identifier comprises an application programming interface (API) key.

32. The system as recited in claim 30, in which said interactions comprise attempts at playing said first game and results of playing said first game, and in which each jackpot contest is associated with a set of parameters, each set of parameters including at least an amount of fee for attempting play of said first game, an allocation of collected fees associated with said jackpot contest, and a duration of said jackpot contest, and in which said notifications at least comprise a status regarding said jackpot contest, a status of escrowed fees, and results of said ranking.

33. The system as recited in claim 30, in which said transactional server is further configured to:

evaluate each contest attempt of said first game based on at least one of a highest score, most kills, fastest time, longest play attempt duration, and highest level reached;

rank results of the contest attempts based on the evaluation; and escrow fees for attempts at playing said first game and allocating revenue for each attempt at playing said first game.

34. The system as recited in claim 30, wherein the first game is executed on a PC, a Mac, a gaming console, an arcade system, or a mobile device.

35. The system as recited in claim 30, wherein the defined contest period comprises a defined contest time period, and wherein each particular contest is completed at the end of the defined contest time period associated with the particular contest.

* * * * *